(12) United States Patent
Prasad et al.

(10) Patent No.: US 9,997,777 B2
(45) Date of Patent: Jun. 12, 2018

(54) ELECTROCHEMICAL DEVICE ELECTRODE INCLUDING COBALT OXYHYDROXIDE

(71) Applicant: The Regents of The University of Michigan, Ann Arbor, MI (US)

(72) Inventors: Binay Prasad, Shelby Township, MI (US); Levi T. Thompson, Ypsilanti, MI (US); Paul G. Rasmussen, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days. days.

(21) Appl. No.: 14/308,019

(22) Filed: Jun. 18, 2014

(65) Prior Publication Data
US 2015/0017544 A1    Jan. 15, 2015

Related U.S. Application Data

(60) Provisional application No. 61/837,504, filed on Jun. 20, 2013.

(51) Int. Cl.
| | |
|---|---|
| *H01M 4/485* | (2010.01) |
| *H01M 4/62* | (2006.01) |
| *H01M 4/58* | (2010.01) |
| *H01M 4/505* | (2010.01) |
| *H01M 4/525* | (2010.01) |
| *H01M 4/66* | (2006.01) |
| *H01M 4/131* | (2010.01) |
| *H01M 4/136* | (2010.01) |
| *H01M 10/0525* | (2010.01) |

(52) U.S. Cl.
CPC .......... *H01M 4/485* (2013.01); *H01M 4/131* (2013.01); *H01M 4/136* (2013.01); *H01M 4/505* (2013.01); *H01M 4/525* (2013.01); *H01M 4/5825* (2013.01); *H01M 4/624* (2013.01); *H01M 4/661* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 6,083,642 A | 7/2000 | Kato et al. |
| 6,210,833 B1 | 4/2001 | Bernard et al. |
| 6,858,347 B2 | 2/2005 | Tanigawa et al. |
| 7,026,069 B1 | 4/2006 | Atwater et al. |
| 7,927,741 B2 | 4/2011 | Takeuchi et al. |

(Continued)

OTHER PUBLICATIONS

Bard, et al., Electrochemistry and Electrogenerated Chemiluminescence of Semiconductor Nanocrystals in Solutions and in Films, Struc. Bond, 2005, 118:1-57.

(Continued)

*Primary Examiner* — Sarah A Slifka
*Assistant Examiner* — Wojciech Haske
(74) *Attorney, Agent, or Firm* — Quarles & Brady LLP

(57) ABSTRACT

This invention discloses an electrochemical device having a multilayer structure and methods for making such a device. Specifically, this invention discloses a multilayer electrochemical device having nano-sized cobalt oxyhydroxide conductive agents and/or active materials within the polymer layers.

14 Claims, 21 Drawing Sheets

(56) References Cited

U.S. PATENT DOCUMENTS

| | | | |
|---|---|---|---|
| 2002/0024041 | A1 | 2/2002 | Tanigawa et al. |
| 2005/0136328 | A1 | 6/2005 | Eylem et al. |
| 2006/0062982 | A1 | 3/2006 | Cunningham et al. |
| 2006/0228629 | A1* | 10/2006 | Christian .............. H01M 4/485 429/231.1 |
| 2006/0263687 | A1 | 11/2006 | Leitner et al. |
| 2010/0055572 | A1 | 3/2010 | Park et al. |
| 2010/0209778 | A1 | 8/2010 | Jouanneau-Si Larbi et al. |
| 2010/0233543 | A1 | 9/2010 | Numata et al. |
| 2011/0220842 | A1 | 9/2011 | Nanjundaswamy et al. |
| 2011/0223477 | A1* | 9/2011 | Nelson .................... H01M 4/06 429/206 |
| 2011/0223493 | A1* | 9/2011 | Christian ................ H01M 4/06 429/344 |
| 2013/0022869 | A1 | 1/2013 | Yi |

OTHER PUBLICATIONS

Bard, et al., Electrochemical Methods, Fundamentals and Applications, Second Edition, Copyright 2001, John Wiley & Sons, Inc. [Title Page and Table of Contents].

Benson, et al., The Cobalt Hydroxide Electrode—II. Electrochemical Behaviour, Electrochimica Acta, 1964, 9:281-288.

Bhakta, et al., The Electrochemical Impedance of Porous Nickel Electrodes in Alkaline Media, Journal of the Electrochemical Society, 1991, 138(5):1353-1358.

Bohnke, et al., Constant Phase Angle Behavior of SnO2/WO3 Thin Film Electrodes in Anhydrous LiClO4-Propylene Carbonate Electrolyte, Electrochimica Acta, 1993, 38(14):1935-1940.

Cahan, et al., Effect of Physical and Geometric Factors on the Impedance of Electrochemical Power Sources, Journal of the Electrochemical Society, 1989, 136(6):1585-1590.

Chen, Discrete Charge Transfer in Nanoparticle Solid Films, J. Mater. Chem., 2007, 17:4115-4121.

Daniel, et al., Gold Nanoparticles: Assembly, Supramolecular Chemistry, Quantum-Size-Related Properties, and Applications Toward Biology, Catalysis, and Nanotechnology, Chem. Rev., 2004, 104:293-346.

Chrzanowski, et al., Methanol Oxidation Catalysis on Well-Defined Platinum/Ruthenium Electrodes: Ultrahigh Vacuum Surface Science and Electrochemistry Approach, Interfacial Electrochemistry: Theory, Experiment and Applications, 1999, pp. 937-954.

Decher, Fuzzy Nanoassemblies: Toward Layered Polymeric Multicomposites, Science, 1997, 277:1232-1237.

Dey, Electrochemical Alloying of Lithium in Organic Electrolytes, Journal of the Electrochemical Society, 1971, 118 (10):1547-1549.

Farcy, et al., Kinetic Study of the Lithium Electroinsertion in V2O5 by Impedance Spectroscopy, Journal of the Electrochemical Society, 1990, 137(5):1337-1341.

Grahame, Mathematical Theory of the Faradaic Admittance, Journal of the Electrochemical Society, 1952, 99 (12):370C-385C.

Guyot-Sionnest, et al., Intraband Spectroscopy and Semiconductor Nanocrystals, Struc. Bond, 2005, 118:59-77.

Guyot-Sionnest, Charging Colloidal Quantum Dots by Electrochemistry, Microchimica Acta, 2008, 160:309-314.

Ho, et al., Application of A-C Techniques to the Study of Lithium Diffusion in Tungsten Trioxide Thin Films, Journal of the Electrochemical Society, 1980, 127(2):343-350.

Huang, et al., Electrochemical Evaluation of LiCoO2 Synthesized by Decomposition and Intercalation of Hydroxides for Lithium-ion Battery Applications, Journal of Applied Electrochemistry, 1998, 28:1365-1369.

Lee, et al., High-Power Lithium Batteries from Functionalized Carbon-Nanotube Electrodes, Nature Nanotechnology, 2010, 5:531-537.

MacDonald, et al., The Electrochemical Impedance of Porous Nickel Electrodes in Alkaline Media, II. Nonuniform Transmission Line Analysis, Journal of the Electrochemical Society, 1991, 138(5):1359-1363.

Murray, Nanoelectrochemistry: Metal Nanoparticles, Nanoelectrodes, and Nanopores, Chem. Rev., 2008, 108:2688-2720.

Orazem, et al., Critical Issues Associated with Interpretation of Impedance Spectra, Journal of Electroanalytical Chemistry, 1994, 378:51-62.

Peng, et al., Controlled Synthesis of High Quality Semiconductor Nanocrystals, Struc. Bond, 2005, 118:79-119.

Santamaria-Perez, et al., The Zintl-Klemm Concept Applied to Cations in Oxides. II. The Structures of Silicates, Struc. Bond, 2005, 118:121-177.

Pistoia, et al., Direct Comparison of Cathode Materials of Interest for Secondary High-Rate Lithium Cells, Electrochimica Acta, 1992, 37(1):63-68.

Pralong, et al., Electrochemical Behavior of Cobalt Hydroxide Used as Additive in the Nickel Hydroxide Electrode, Journal of the Electrochemical Society, 2000, 147(4):1306-1313.

Raimondi, et al., Nanoparticles in Energy Technology: Examples from Electrochemistry and Catalysis, Angew. Chem. Int. Ed., 2005, 44:2190-2209.

Ratnakumar, et al., A.c. Impedance of Niobium Triselenide Cathode in Secondary Lithium Cells, Journal of Applied Electrochemistry, 1989, 19:813-818.

Riley, Electrochemistry in Nanoparticle Science, Current Opinion in Colloid and Interface Science, 2002, 7:186-192.

Thomas, et al., AC Impedance Analysis of Polycrystalline Insertion Electrodes: Application to Li1-xCoO2, Journal of the Electrochemical Society, 1985, 132(7):1521-1528.

Vidotti, et al., Electrocatalytic Oxidation of Urea by Nanostructured Nickel/Cobalt Hydroxide Electrodes, Electrochimica Acta, 2008, 53:4030-4034.

Wang, et al., Pseudocapacitive Contributions to Electrochemical Energy Storage in TiO2 (Anatase) Nanoparticles, J. Phys. Chem. C., 2007, 111:14925-14931.

Zhao, et al., Synthesis and Characterization of Prussian Blue Modified Magnetite Nanoparticles and Its Application to the Electrocatalytic Reduction of H2O2, Chem. Mater., 2005, 17:3154-3159.

Alkire, et al., Advances in Electrochemical Science and Engineering, vol. 8, Copyright 2003 Wiley-VCH Verlag GmbH & Co. [Book Review Only].

PCT International Search Report and Written Opinion, PCT/US2014/043130, Dec. 30, 2014.

PCT International Preliminary Report on Patentability, PCT/US2014/043130, Dec. 30, 2015.

* cited by examiner

ELECTROCHEMICAL DEVICE ELECTRODE INCLUDING COBALT OXYHYDROXIDE

CROSS-REFERENCES TO RELATED APPLICATIONS

This application claims the benefit of U.S. Provisional Patent Application No. 61/837,504, filed Jun. 20, 2013, which is incorporated herein by reference for all purposes.

STATEMENT REGARDING FEDERALLY SPONSORED RESEARCH

Not Applicable.

BACKGROUND OF THE INVENTION

1. Field of the Invention

This invention relates to an electrochemical device having a multilayer structure and methods for making such a device. Specifically, this invention relates to a multilayer electrochemical device having nano-sized conductive agents and/or active materials within polymer layers.

2. Description of the Related Art

Cobalt oxyhydroxide (CoOOH) has been used in the nickel electrode of NiCd and NiMH batteries as an electronic conductor (Pralong, Delahyaye-Vidal, et al., 2000). Cobalt hydroxide [$Co(OH)_2$] is currently added to the nickel hydroxide paste to prepare the nickel composite electrode used in nickel based rechargeable alkaline batteries. Cobalt incorporation into the active mass of the nickel oxide electrode is usually realized either by chemical substitution of nickel during the $Ni(OH)_2$ synthesis (e.g., co-precipitation) or by separate addition of cobalted component, namely, cobalt-based salts.

Benson et al. studied the electrochemical behavior of cobalt compounds in alkaline medium and their results showed a poor performance of electrochemical reversibility for cobalt hydroxide/oxyhydroxide (Benson, Briggs, et al., 1964). Butel et al. studied the electrochemical behavior of CoOOH prepared from a ceramic precursor $Na_{0.6}CoO_2$. The results from Butel et al. show the presence of an electronically conductive $\beta'$-CoOOH$_x$ containing small amounts of $Co^{+4}$ (Butel, Gautier, et al., 1999). Butel et al. further found that a voltage reduction of this $\beta'$ phase down to 0.92V [vs. Cd/Cd(OH)$_2$] led to a stoichiometric phase of $\beta$-CoOOH which is not so conductive. The results from Butel et al. are consistent with the observations in Pralong et al.

Generally, carbon is added in lithium ion batteries to provide conductivity. However, carbon is usually combustible. Therefore, there are disadvantages when using carbon conductive agents, especially for commercial applications such as aircraft.

Thus, needed in the art are electrochemical devices having nano-sized conductive agents and/or active materials that are less combustible and that can be prepared using an in situ method and process. It would be of great significance that the electrochemical devices can be produced at room temperature and no carbon conductive agents are needed for increasing conductivity of the electrochemical devices.

SUMMARY OF THE INVENTION

The present invention provides multilayer electrochemical devices having nano-sized conductive agents and/or active materials. In one form, the non-combustible conductive agent is a metal hydroxide, i.e., cobalt oxyhydroxide, which has significant advantages over carbon containing conductive agents. It is believed that cobalt oxyhydroxide has never been used in certain batteries, such as lithium ion batteries.

In one aspect, the present invention relates to an electrode comprising an active material comprising an alkali metal compound providing an alkali metal ion for an electrochemical reaction; and a conductive agent comprising cobalt oxyhydroxide. The active material can be selected from the group consisting of lithium cobalt oxide, lithium iron phosphate, lithium manganese oxide, lithium nickel manganese cobalt oxide, lithium nickel cobalt aluminum oxide, lithium titanate, lithium vanadium oxide, lithium iron fluorophosphates, sodium iron phosphate, sodium iron fluorophosphates, sodium vanadium fluorophosphates, sodium vanadium chromium fluorophosphates, sodium hexacyanometallates, potassium hexacyanometallates, and lithium-containing layered compounds having hexagonal symmetry based on $\alpha$-NaFeO$_2$ structure with a space group of R3$^-$m. The active material can be lithium cobalt oxide. At least some cobalt in the cobalt oxyhydroxide of the conductive agent has a +4 oxidation state and/or at least some cobalt in the cobalt oxyhydroxide of the conductive agent has a +3 oxidation state. The conductive agent can comprise nanoparticles. The active material and the conductive agent are supported on a substrate which may comprise a metal selected from aluminum, copper, silver, iron, zinc, nickel, titanium, and gold. The electrode can be a positive electrode of an electrochemical device including a negative electrode and a non-aqueous electrolyte. The negative electrode can comprise a negative electrode active material selected from lithium metal and alloys of lithium.

In another aspect, the present invention relates to an electrode comprising a substrate; and one or more of a multilayer structure formed on the substrate. The multilayer structure can include an anionic polymer layer, a conductive agent layer, and a cationic polymer layer, wherein the conductive agent layer comprises cobalt oxyhydroxide. A first thickness of the anionic polymer layer can be in the range of 0.2 nanometers to 50 nanometers, and a second thickness of the cationic polymer layer can be in the range of 0.2 nanometers to 50 nanometers. At least some cobalt in the cobalt oxyhydroxide of the conductive agent layer can have a +4 oxidation state and/or at least some cobalt in the cobalt oxyhydroxide of the conductive agent layer can have a +3 oxidation state. The conductive agent can comprise nanoparticles. The anionic polymer can be polyethylene oxide. The cationic polymer can be poly(allyl amine) hydrochloride. The electrode may include ten to fifty of the multilayer structure. The thickness of each multilayer structure can be in the range of 1 nanometer to 50 nanometers.

In the electrode with multilayer structures, an active material can be included in the conductive agent layer, and the active material can comprise an alkali metal compound providing an alkali metal ion for an electrochemical reaction. The active material can be selected from the group consisting of lithium cobalt oxide, lithium iron phosphate, lithium manganese oxide, lithium nickel manganese cobalt oxide, lithium nickel cobalt aluminum oxide, lithium titanate, lithium vanadium oxide, lithium iron fluorophosphates, sodium iron phosphate, sodium iron fluorophosphates, sodium vanadium fluorophosphates, sodium vanadium chromium fluorophosphates, sodium hexacyanometallates, potassium hexacyanometallates, and lithium-containing layered compounds having hexagonal symmetry based on $\alpha$-NaFeO$_2$ structure with a space group of R3$^-$m. The active material can be lithium cobalt oxide. The substrate can comprise a metal selected from aluminum, copper, silver, iron, zinc, nickel, titanium, and gold.

The electrode with multilayer structures can be a positive electrode of an electrochemical device including a negative electrode and a non-aqueous electrolyte. The negative electrode can comprise a negative electrode active material selected from lithium metal and alloys of lithium. The electrochemical device can be a lithium ion battery. The electrochemical device can be a capacitor.

In another aspect, the present invention relates to a method for producing an electrode. The method can include the steps of: (a) contacting a substrate with one of an anionic polymer solution and a cationic polymer solution to create a first polymer layer on the substrate; (b) contacting the first polymer layer with a cobalt hydroxide solution to create a chemical layer including cobalt hydroxide on the first polymer layer; (c) contacting the chemical layer with the other of the anionic polymer solution and the cationic polymer solution not used in step (a) to create a second polymer layer; (d) oxidizing cobalt hydroxide in the chemical layer into cobalt oxyhydroxide wherein at least some cobalt in the cobalt oxyhydroxide has a +3 oxidation state; and (e) chemically producing in the chemical layer an active material and a conductive agent of cobalt oxyhydroxide wherein at least some cobalt in the cobalt oxyhydroxide of the conductive agent has a +4 oxidation state.

In the method, steps (a) to (c) can be repeated for a number of times (e.g., ten to fifty) to form multilayer structures on the substrate having layers of the anionic polymer, cobalt hydroxide, and the cationic polymer. The active material and the conductive agent may be produced electrochemically under an air-free condition. The cobalt hydroxide may be oxidized in air. An electrolytic cell can be built by using the electrode as the cathode and by using a second electrode as the anode. The second electrode can comprise an electrode material selected from lithium metal and alloys of lithium. The active material can be lithium cobalt oxide. A conductive agent of cobalt oxyhydroxide having both +3 and +4 oxidation states can be produced when the electrolytic cell is charged at least at a rate of C/5. A first thickness of the first polymer layer and a second thickness of the second polymer layer can be maintained in the range of 0.2 nanometers to 50 nanometers by adjusting pH values of the anionic polymer solution and the cationic polymer solution. The substrate can comprise a metal selected from aluminum, copper, silver, iron, zinc, nickel, titanium, and gold.

In another aspect, the present invention relates to a positive electrode active material for a lithium battery, and the active material comprises a lithium metal oxide, and a conductive agent comprising cobalt oxyhydroxide.

In another aspect, the present invention relates to an electrochemical device. Specifically, the electrochemical device comprises a positive electrode comprising a metal substrate and a multilayer structure formed on the metal substrate having repeatable layers of an anionic polymer layer, an active material and conductive agent layer, and a cationic polymer layer, a negative electrode, and a non-aqueous electrolyte. In one embodiment, the metal substrate is aluminum. In one embodiment, the thickness of each of the repeatable layer is in the range of 1 nanometer to 50 nanometers. In another embodiment, the conductive agent is cobalt oxyhydroxide. In one embodiment, the anionic polymer is polyethylene oxide. In another embodiment, the cationic polymer is poly(allyl amine) hydrochloride. In one embodiment, the electrochemical device is a lithium ion battery. In another embodiment, the electrochemical device is a capacitor. In one embodiment, the multilayer structure includes ten to fifty repeatable layers of an anionic polymer layer, an active material and conductive agent layer, and a cationic polymer layer.

In another aspect, the present invention relates to a multilayer conductor comprising repeatable layers of an anionic polymer layer, a conductive agent layer, and a cationic polymer layer. In one embodiment of the conductor, the conductor further comprises an active material in the conductive agent layer. In another embodiment, the thickness of each of the repeatable layers is in the range of 1 nanometer to 50 nanometers. In one embodiment of the conductor, the conductive agent is cobalt oxyhydroxide. In one embodiment of the conductor, the anionic polymer is polyethylene oxide. In one embodiment of the conductor, the cationic polymer is poly(allyl amine) hydrochloride.

In one aspect, the present invention relates to a method of producing a positive electrode. The method comprises the steps of immersing a first metal substrate in an anionic polymer solution; immersing the first metal substrate in a cobalt hydroxide solution; immersing the first metal substrate in a cationic polymer solution; repeating steps a)-c) for a desired number of times to form a multilayer structure on the first metal substrate having repeatable layers of the anionic polymer, cobalt hydroxide, and the cationic polymer; oxidizing cobalt hydroxide into cobalt oxyhydroxide wherein cobalt has a +3 oxidation state in the cobalt oxyhydroxide; and chemically producing a layer including an active material and a conductive agent of cobalt oxyhydroxide wherein cobalt has both +3 and +4 oxidation states in the cobalt oxyhydroxide. In one embodiment of the method, step f) comprises electrochemically producing the layer. In one embodiment of the method, step e) comprises oxidizing cobalt hydroxide in air. In one embodiment of the method, step a) further comprises washing the first metal substrate with water, and step b) further comprises washing the first metal substrate with water, and step c) further comprises washing the first metal substrate with water. In one embodiment of the method, step f) comprises electrochemically producing the layer under an air-free condition. In one embodiment of the method, step f) comprises building an electrolytic cell under an air-free condition by using the multilayer structure on the metal substrate having cobalt oxyhydroxide with +3 oxidation state as the cathode and by using a second metal substrate as the anode. In one embodiment, the second metal substrate is lithium.

In one embodiment of the method, the active material is lithium cobalt oxide. In one embodiment of the method, the conductive agent of cobalt oxyhydroxide having both +3 and +4 oxidation states is produced when the electrolytic cell is charged at least at a rate of C/5. In one embodiment of the method, lithium cobalt oxide is produced when the electrolytic cell is discharged at about 3V. In one embodiment of the method, the steps a)-d) further comprise maintaining the layer thickness in the range of 0.2 nanometer-50 nanometer by adjusting pH values of the solutions. In one embodiment of the method, the desired number of repeated times in the step d) is ten to fifty.

In another aspect, the present invention relates to a method of producing a multilayer conductor. The method comprises the steps of a) immersing a first metal substrate in an anionic polymer solution; b) immersing the first metal substrate in a cobalt hydroxide solution; c) immersing the first metal substrate in a cationic polymer solution; d) repeating steps a)-c) for a desired number of times to form a multilayer structure on the first metal substrate having repeatable layers of the anionic polymer, cobalt hydroxide, and the cationic polymer; e) oxidizing cobalt hydroxide into cobalt oxyhydroxide wherein cobalt has a +3 oxidation state in the cobalt oxyhydroxide; and f) chemically converting cobalt oxyhydroxide wherein cobalt has +3 oxidation state into a conductive agent of cobalt oxyhydroxide wherein cobalt has both +3 and +4 oxidation states. In one embodiment, step f) comprises electrochemically producing the layer. In one embodiment, step e) comprises oxidizing cobalt hydroxide in air. In one embodiment, step a) further comprises washing the first metal substrate with water, and step b) further comprises washing the first metal substrate with water, and step c) further comprises washing the first metal substrate with water. In one embodiment, step f) comprises electrochemically producing the layer under a air-free condition.

In one embodiment, the method further comprises building an electrolytic cell under an air-free condition by using the multilayer structure on the metal substrate having cobalt oxyhydroxide wherein cobalt has +3 oxidation state as the cathode and by using a second metal substrate as the anode. In one embodiment, the conductive agent of cobalt oxyhydroxide wherein cobalt has both +3 and +4 oxidation states is produced when the electrolytic cell is charged at least at a rate of C/5. It is therefore an advantage of the invention to provide a method and process for in situ producing such multilayer electrochemical devices.

These and other features, aspects, and advantages of the present invention will become better understood upon consideration of the following detailed description, drawings and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Figure 1:
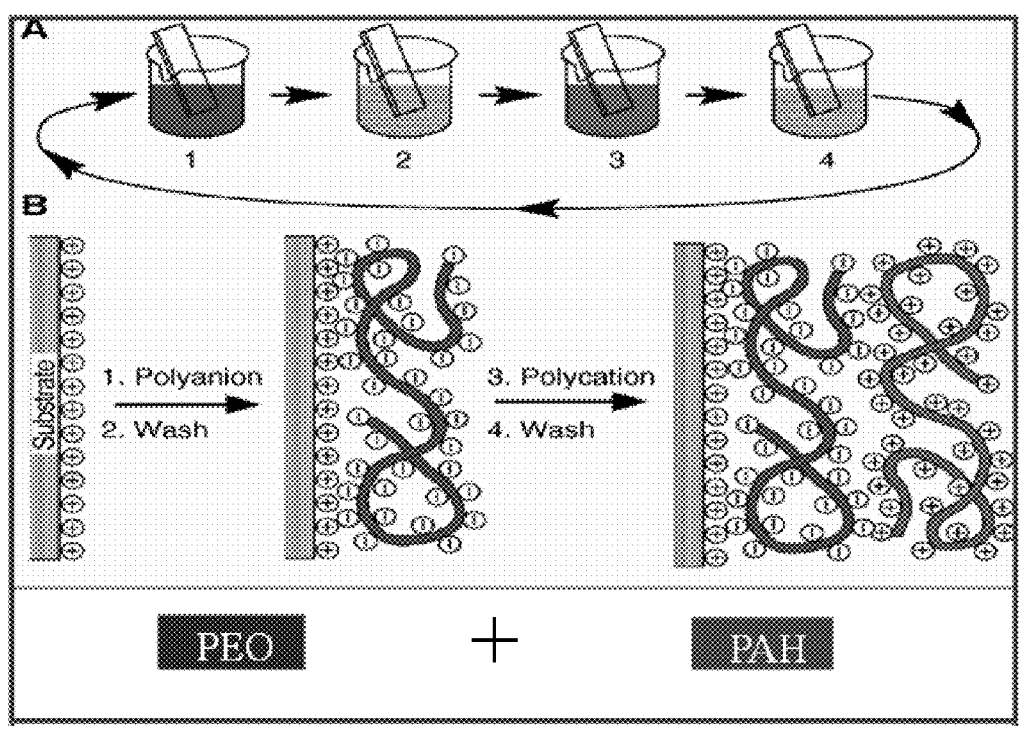
FIG. 1 is a schematic diagram showing a layer by layer (LBL) process according to one embodiment of the present invention. (A) A schematic diagram of the film deposition process using slides and beakers. Steps 1 and 3 represent the adsorption of an anionic polymer and a cationic polymer, respectively, and steps 2 and 4 are washing steps. The four steps are the basic buildup sequence for the simplest film architecture, (A/B)n. The construction of more complex film architectures requires only additional beakers and a different deposition sequence. (B) A simplified molecular picture of the first two adsorption steps, depicting film deposition starting with a positively charged substrate. Counterions are omitted for clarity. The polymer conformation and layer interpenetration are an idealization of the surface charge reversal with each adsorption step. (C) Two typical polymers, polyethylene oxide (PEO) and poly(allylamine hydrochloride) (PAH) (Decher, 1997).

The term "stable metal," as used herein, refers to a metal or an alloy that is resistant to corrosion and oxidation in an aqueous solution or in moist air. An example of stable metal may include noble metals or related alloys, e.g., ruthenium, rhodium, palladium, silver, osmium, iridium, platinum, and gold. A stable metal in the present invention may also include aluminum (Al), copper (Cu), iron (Fe), Zinc (Zn), and related alloys.

The term "anionic polymer," as used herein, refers to a polymer having overall negative charges. In the present invention, anionic polymers are attached to a metal surface having positive charges by an electrostatic force.

The term "cationic polymer," as used herein, refers to a polymer having overall positive charges. In the present invention, cationic polymers are attached to an anionic polymer layer on a metal surface by an electrostatic force.

In one embodiment, the present invention relates to an electrochemical device. A suitable electrochemical device for the present invention may include, a conductor, a battery, a capacitor, a sensor, a photoelectrochemical solar cell or any other electrochemical energy storage devices. A suitable electrochemical device may further include a light-emitting electrochemical cell (LEO or LEEC), a light-emitting device (LED), a fuel cell or any other electrochemical devices. A capacitor may include an ultracapacitor, also referred to as a supercapacitor, an electrical double-layer capacitor, or an electrochemical capacitor. In one preferred embodiment, the present invention relates to a battery and/or a capacitor. More preferably, a battery of the present invention may include a lithium ion battery (LIB), a sodium ion battery (SIB), or a potassium ion battery (PIB).

An applicable LIB may include any LIB using metal oxides as a cathode material. A suitable metal oxide for cathode materials may include lithium cobalt oxide (LCO), lithium iron phosphate (LFP), lithium manganese oxide (LMO), lithium nickel manganese cobalt oxide (NMC), lithium nickel cobalt aluminum oxide (NCA), lithium titanate (LTO), lithium vanadium oxide (LVO), lithium iron fluorophosphates, and others. In another embodiment, the cathode material may include sodium iron phosphate, sodium iron fluorophosphates, sodium vanadium fluorophosphates, sodium vanadium chromium fluorophosphates, sodium hexacyanometallates, and potassium hexacyanometallates. Non-limiting example hexacyanometallates include sodium and potassium compounds having a Prussian Blue crystal structure in which transition metal ions are linked by a face-centered cubic framework of cyanide groups (e.g., copper potassium hexacyanoferrate). In another embodiment, a suitable metal oxide for cathode materials in the present invention may include any lithium-containing layered compounds having hexagonal symmetry based on α-NaFeO$_2$ structure with a space group of R3$^-$m, such as LiNiO$_2$, $LiNi_xCo_yO_2$, $LiMn_xCo_yO_2$, $LiMn_xNi_yO_2$, $LiNi_xCo_yAlO_2$, $LiNi_{1/3}Mn_{1/3}Co_{1/3}O_2$ and others. Further, many different elements, e.g., Co, Mn, Ni, Cr, Al, or Li, may be substituted or additionally added into the α-NaFeO$_2$ structure to influence electronic conductivity, ordering of the layer, stability on delithiation and cycling performance of the cathode materials. A suitable cathode material may also include doping another material into the metal oxides. For example, one can dope aluminum, niobium and zirconium into a metal oxide to boost the material's conductivity. One can also dope one metal material to increase another metal oxide material's performance, e.g., 5% vanadium-doped Lithium iron phosphate olivine.

In one embodiment, the present invention is an electrochemical device comprising a positive electrode having a multilayer structure. The positive electrode having a multilayer structure may be produced from any suitable methods. In one specific embodiment, the positive electrode having a multilayer structure may be produced from a layer by layer (LBL) process. A multilayer structure may be fabricated by consecutive adsorption of anionic polymers (AP; polyanions) and cationic polymers (CP; polycations) on the metal substrate.

FIG. 1 is a schematic diagram depicting a LBL process according to one embodiment of the present invention. As shown in FIG. 1A, a first metal substrate is provided. The first metal substrate may include any stable and conductive metals. A suitable metal substrate may include aluminum (Al), copper (Cu), silver (Ag), iron (Fe), Zinc (Zn), nickel (Ni), titanium (Ti), or gold (Au). In one preferred embodiment, the metal substrate is Al. As shown in FIG. 1B, a metal substrate such as Al generally has positive charges on its surface.

As shown in FIG. 1A, aqueous solutions of an anionic polymer (polyanion; Beaker 1) and a cationic polymer (polycation; Beaker 2) are made. A suitable concentration of the polymers may be in the range of 0.01-1000 mg/mL, preferably 0.1-100 mg/mL, and more preferably 1-10 mg/mL. Although polyethylene oxide (PEO) and poly(allyl amine) hydrochloride (PAH) are used as the anionic polymer and the cationic polymer, respectively, for demonstration in the present invention, a person having ordinary skill in the art will understand that any non-conductive anionic and cationic polymers are suitable for the present invention.

TABLE 1

| Polymers | Untreated (Ohms) | After Electrochemical Conversion (Ohms) | Tried as battery cathode |
|---|---|---|---|
| Polyethylene Oxide (PEO) | MegaOhms | 1 to 30 | Yes |
| Polyallylhydrochloride (PAH) | MegaOhms | 43 | Yes |
| PolyAcrylAmide (PAAm) | MegaOhms | 40 | No |
| Polyvinyl Pyrolidione (PVP) | MegaOhms | 20 | No |
| Commercial Cathode | | 0.1 to 10 | |

Figure 13:
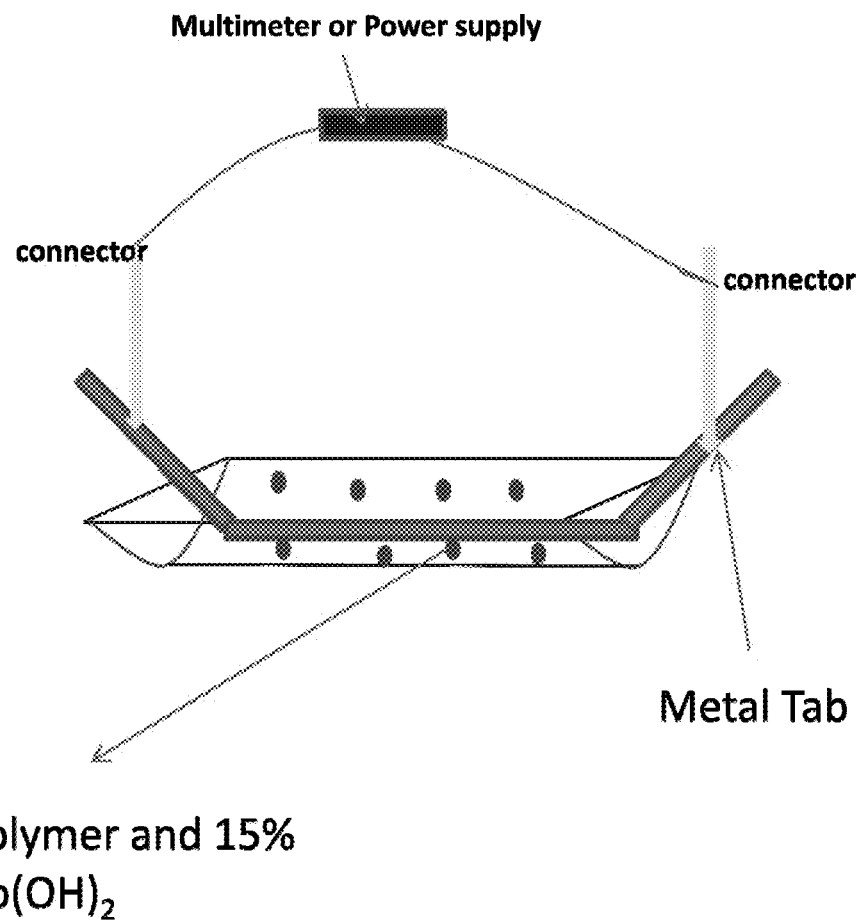
FIG. 13 is a diagram showing one exemplary setup for conductivity measurement. The Polymer and Cobalt Hydroxide are mixed with binder and made into a paste with NMP. Material is poured in the container over the tab and allowed to dry at 80° C. Impedance measurement done after drying (1-30 MegaOhms). Impedance measurement done after Electrochemical Treatment, washing and drying at 80° C. (1-50 Ohms).
Figure 14:
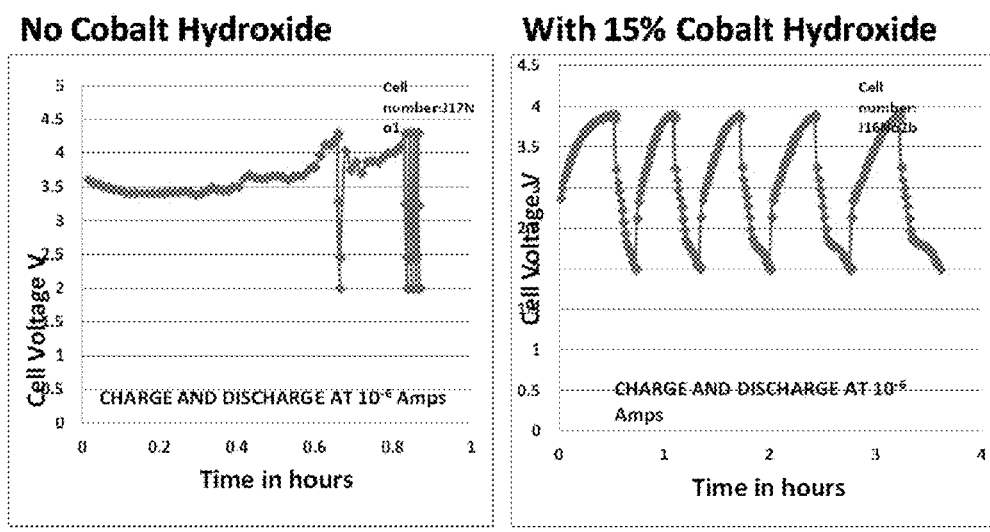
FIG. 14 is a set of graphs showing half-cell performance of Lithium Cobalt Oxide in the absence of cobalt hydroxide (left) and in the present of cobalt hydroxide (right). No cobalt hydroxide was added into the cell for the measurement in the left graph. 15% cobalt hydroxide was added into the cell for the measurement in the right graph. Electrodes were made with LiCoO$_2$ powder, PVdf binder and NMP. In one group carbon is removed entirely; in another Cobalt Hydroxide is added but no carbon. Hand pasted electrodes were made in Lab with room for future improvement. Charge and discharge were conducted at 10$^{-6}$ Amps.
Figure 15:
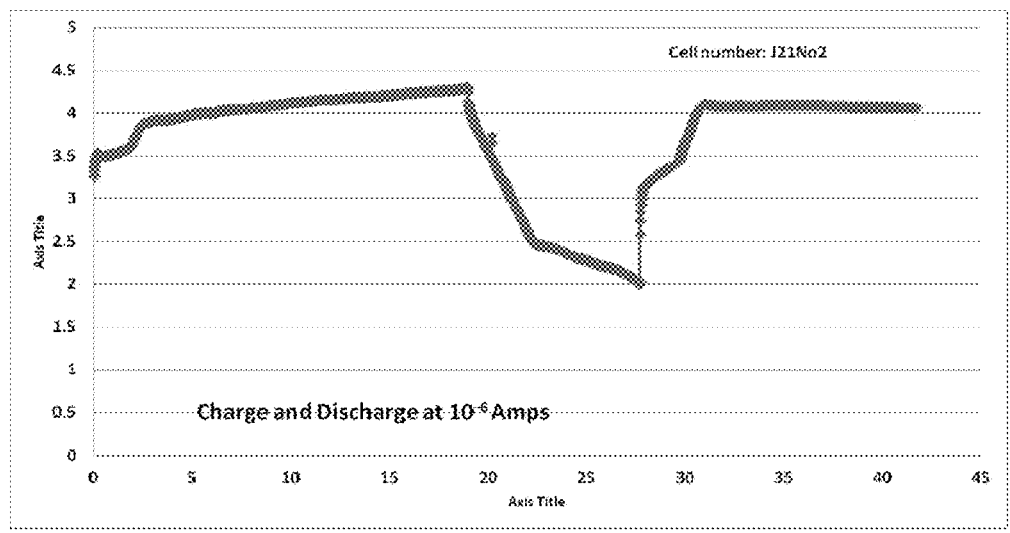
FIG. 15 is a graph showing the cell performance of Lithium Cobalt Oxide in the present of cobalt hydroxide. The cell was built with LiCoO$_2$, 5% binder and 15% Co(OH)$_2$ vs. lithium.

Table 1 shows conductivity measurements of different polymers. Applicants chose PEO and PAH as exemplary anionic and cationic polymers in the present invention because PEO and PAH have relatively low conductivity. The conductivity has been measured by using the experimental setup as shown in FIG. 13.

By controlling the pH values in the range of about 4.5-6 for the polymer solutions, a desired thickness of 0.5-8 nanometer of each polymer thin layer may be obtained. A detailed information of controlling thickness of the polymer layers has been described in Iler, et al (R. K. Iler, 1966).

As shown in FIG. 1A-1B, after the Al substrate is immersed in the PEO solution (Beaker 1), a thin layer of PEO is absorbed on the surface of the Al substrate due to the electrostatic interaction between Al substrate and PEO. After the absorption of thin layer of PEO on its surface, the Al substrate is washed in water (Beaker 2). The Al substrate having a thin layer of PEO on its surface is subsequently immersed in the PAH solution (Beaker 3). A thin layer of PAH is absorbed on the top of the PEO layer on the Al substrate due to the electrostatic interaction between PEO and PAH. After a washing step (Beaker 4), the Al substrate may be immersed in the PEO solution, leading to the formation of another PEO thin layer on the top of the PAH layer. An exemplary multilayer structure was described by Decher et al. (Decher, 1997).

In one embodiment of the present invention, one chemical layer may be formed between each of PEO and PAH thin layers. The chemical layer may be formed after the corresponding Al substrate is immersed in the chemical solution. The chemical layer may include any chemicals which can be converted into an active material and/or a conductive material upon further chemical reaction. A suitable chemical reaction for the present invention may include electrochemical reactions. In one specific embodiment, the chemical layer may include cobalt hydroxide $[Co(OH)_2]$. Cobalt hydroxide may be converted into metal cobalt oxide as an electrochemically active material and cobalt oxyhydroxide (CoOOH) as a conductive material. In another specific embodiment, the electrochemically active material may be lithium cobalt oxide ($LiCoO_2$).

Figure 2A:
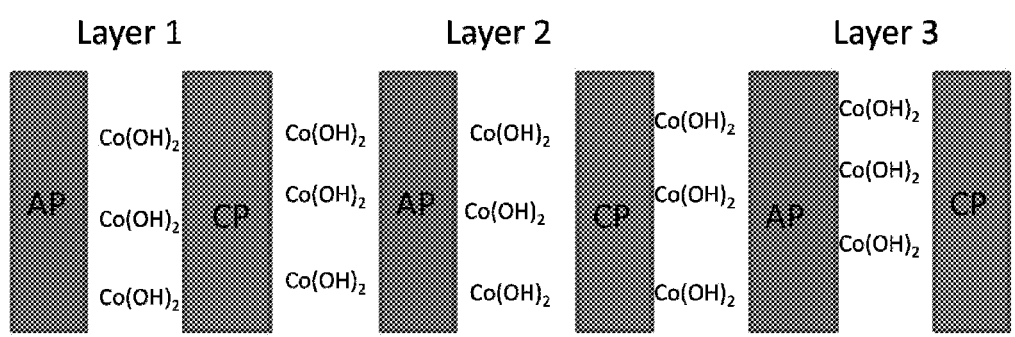
FIG. 2a is a schematic diagram showing a multilayer structure formed from an LBL process. On the surface of a metal substrate (not shown), a repeatable multilayer structure is formed. Each repeatable layer includes an anionic polymer (AP) layer, a cobalt hydroxide layer, and a cationic polymer (CP) layer. Although a three-layer structure is displayed, the present invention is applicable to a multilayer structure having any number of layers.

FIG. 2a depicts a multilayer structure on a metal substrate (not shown) formed from an LBL process according one embodiment of the present invention. As shown in FIG. 2a, one anionic polymer (AP) layer, e.g., PEO, one chemical layer, e.g., cobalt hydroxide, and one cationic polymer (CP) layer, e.g., PAH, constitute a repeatable layer (layers 1-3). Although one multilayer structure having three repeatable layers is shown in FIG. 2a, a person having ordinary skills in the art will understand that one multilayer structure having any number of repeatable layers may be produced. The above steps may be repeated for many times until a desirable number of repeatable layers is obtained. In one embodiment, a desirable number of the repeatable layers may be in the range of 5-100, preferably 10-50, more preferably 20.

As shown in FIG. 2a, each of the AP layer, e.g., PEO, the chemical layer, e.g., cobalt hydroxide, and the CP layer, e.g., PAH, may have a thickness of 0.5-8 nanometer. The thickness of each repeatable layer may be in the range of 0.2-1000 nanometer, preferably 0.5-200 nanometer, more preferably 1-50 nanometer.

Although a multilayer structure having one single anionic or cationic polymer is depicted in FIG. 2a, the present invention is applicable to multilayer structures having multiple anionic or cationic polymers. For example, a multilayer structure may have repeatable layers including different anionic or cationic polymer layers.

One or more washing steps may be included after the adsorption of each layer to avoid contamination of the next adsorption solution by liquid adhering to the substrate from the previous adsorption step. The washing step may also help to stabilize weakly adsorbed polymer and chemical layers.

In one embodiment of the present invention, the chemical layer in the multilayer structure may be oxidized. For example, some of the cobalt hydroxides included in the multilayer structure may be oxidized into cobalt oxyhydroxides wherein cobalt has +3 oxidation state. The oxidation reaction may be conducted either under air or under an oxygen-rich condition. In one specific embodiment, the cobalt hydroxide layers may be partially oxidized into cobalt oxyhydroxide layers having $Co^{+3}$ oxidation state during the LBL process and the subsequent drying process. Cobalt oxyhydroxide layers wherein cobalt has +3 oxidation state may not be conductive.

Figure 2B:
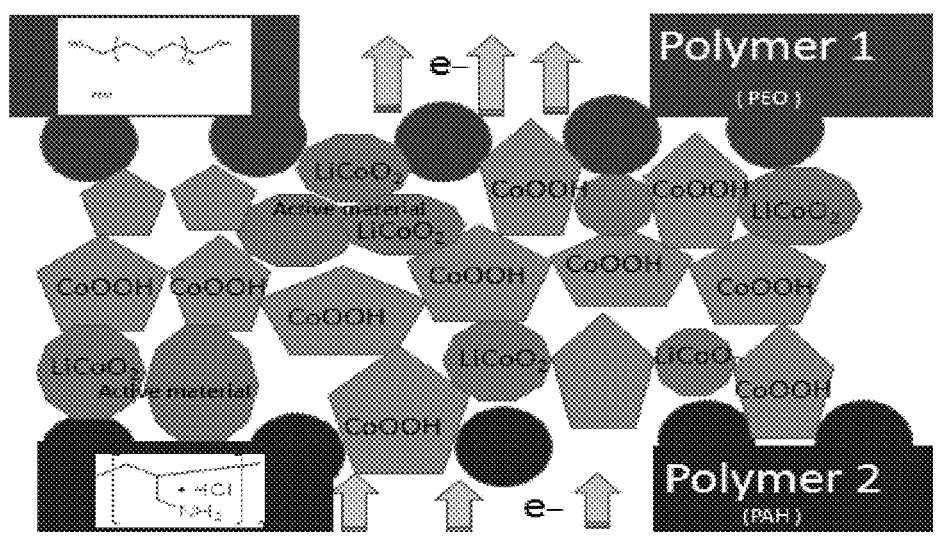
FIG. 2b is a schematic diagram showing the cross-section of a repeatable layer in a positive electrode according to one embodiment of the present invention. The positive electrode is produced following an oxidation process and an electrochemical treatment of the multilayer structure shown in FIG. 2a. Each repeatable layer of the positive electrode includes an anionic polymer layer (Polymer 1; AP), an active material and conductive agent layer, and a cationic polymer layer (Polymer 2; CP). The example of anionic polymers may include polyethylene oxide (PEO). The example of cationic polymers may include poly(allylamine) hydrochloride (PAH). The active material may include lithium cobalt oxide ($LiCoO_2$). The conductive agent may include cobalt oxyhydroxide (CoOOH).

In another embodiment of the present invention, cobalt hydroxide and cobalt oxyhydroxide having $Co^{+3}$ oxidation state in the multilayer structure on a metal substrate may be chemically converted into metal cobalt oxide, as active materials, and cobalt oxyhydroxide having $Co^{+4}$ and $Co^{+3}$ oxidation states, as conductive agents, respectively. A positive electrode may thus be formed. In one specific embodiment, the active materials in the positive electrode are lithium cobalt oxide ($LiCoO_2$). FIG. 2b depicts the cross-section of a repeatable layer in a positive electrode according to one embodiment of the present invention. As shown in FIG. 2b, between one AP layer (e.g., PEO layer) and one CP layer (e.g., PAH layer), a mixture layer including active materials of lithium cobalt oxide and conductive agents of cobalt oxyhydroxide having $Co^{+4}$ and $Co^{+3}$ oxidation states are formed.

Figure 3:
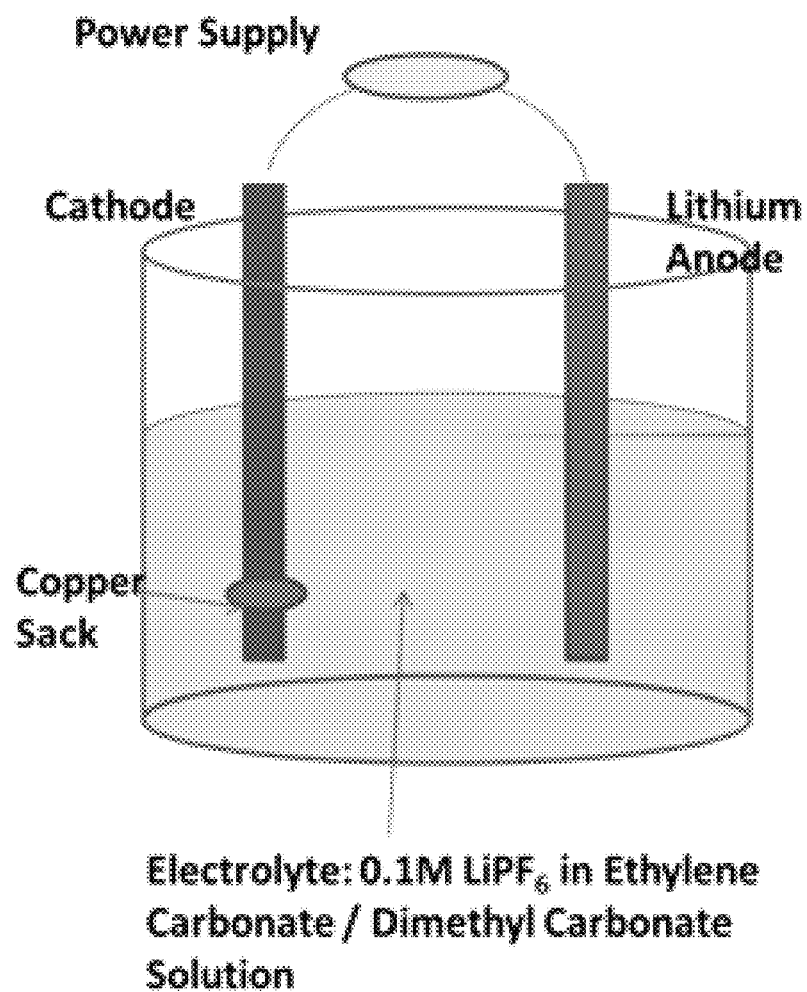
FIG. 3 is a schematic diagram showing the electrolytic cell for producing a positive electrode shown in FIG. 2b from a multilayer structure shown in FIG. 2a. The multilayer structure shown in FIG. 2a was initially oxidized in air. The as-produced positive electrode comprises a metal substrate and a multilayer structure formed on the metal substrate having repeatable layers of an anionic polymer layer, an active material and conductive agent layer, and a cationic polymer layer according to one embodiment of the present invention.

In one specific embodiment of the present invention, the multilayer structure on a metal substrate may be electrochemically converted into a positive electrode. FIG. 3 shows an apparatus e.g., an electrolytic cell, for producing a positive electrode shown in FIG. 2b from a multilayer structure shown in FIG. 2a. In one embodiment, the electrochemical conversion may be conducted under an air-tight condition. In one specific embodiment, the air-tight condition may include an argon-filled glove box.

As shown in FIG. 3, the electrolytic cell may include a container holding an electrolyte, a power supply, a cathode, an anode, and the cathode and anode partially immersed in the electrolyte. In one embodiment, the cathode may be a multilayer structure including a chemical layer on a metal substrate. In one specific embodiment, the cathode may be a multilayer structure as shown in FIG. 2a, and some of the cobalt hydroxides included in the multilayer structure may be oxidized into cobalt oxyhydroxides wherein cobalt has +3 oxidation state. In one specific embodiment, the anode may be lithium. In another specific embodiment, the cathode may include a copper sack to maintain the voltage at about 3 V during the electrochemical process.

The electrolyte may include any mixture of organic carbonates such as ethylene carbonate or diethyl carbonate containing complexes of lithium ions. These non-aqueous electrolytes may use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiCF_3SO_3$), $LiBC_4O_8$ (LiBOB) or $Li[PF_3(C_2F_5)_3]$ (LiFAP), dissolved in a mixture of organic alkyl carbonate solvents. As flammable organic electrolyte solvents currently in use may have a risk of heat generation, thermal runaway and fire, additives, e.g., vinylene carbonate, may be added to stabilize the electrolyte/electrode interface. In one specific embodiment, 0.1M $LiPF_6$ in ethylene carbonate/dimethyl carbonate (1:1) solution may be used as the electrolyte.

The negative electrode may comprise a negative electrode active material selected from lithium metal, alloys of lithium (e.g., lithium titanate), silicon, and carbon (e.g., hard carbon, graphite).

In one embodiment, the electrolytic cell may be discharged at about 3 V for at least 2 hours, cobalt hydroxide in the multilayer structure on the cathode may be converted into active materials of lithium cobalt oxide. In another embodiment, Applicants envision that the present invention may be applicable to produce active materials for other battery systems, e.g., sodium ion battery and potassium ion battery. Different discharge voltages may be applied to produce active materials for other battery systems.

In another embodiment, the electrolytic cell may be charged with a rate greater than C/5. Cobalt oxyhydroxides having $Co^{+3}$ oxidation state in the multilayer structure on the cathode may be converted into cobalt oxyhydroxides having both $Co^{+3}$ and $Co^{+4}$ oxidation states, an electrically conductive form. A positive electrode comprising a metal substrate and a multilayer structure formed on the metal substrate having repeatable layers of an anionic polymer layer, an active material and conductive agent layer, and a cationic polymer layer may thus be formed. In one specific embodiment, the metal substrate may be aluminum. The anionic polymer may be PEO. The cationic polymer may be PAH. The active material may be lithium cobalt oxide. The conductive agent may be cobalt oxyhydroxides having both $Co^{+3}$ and $Co^{+4}$ oxidation states.

Figure 4:
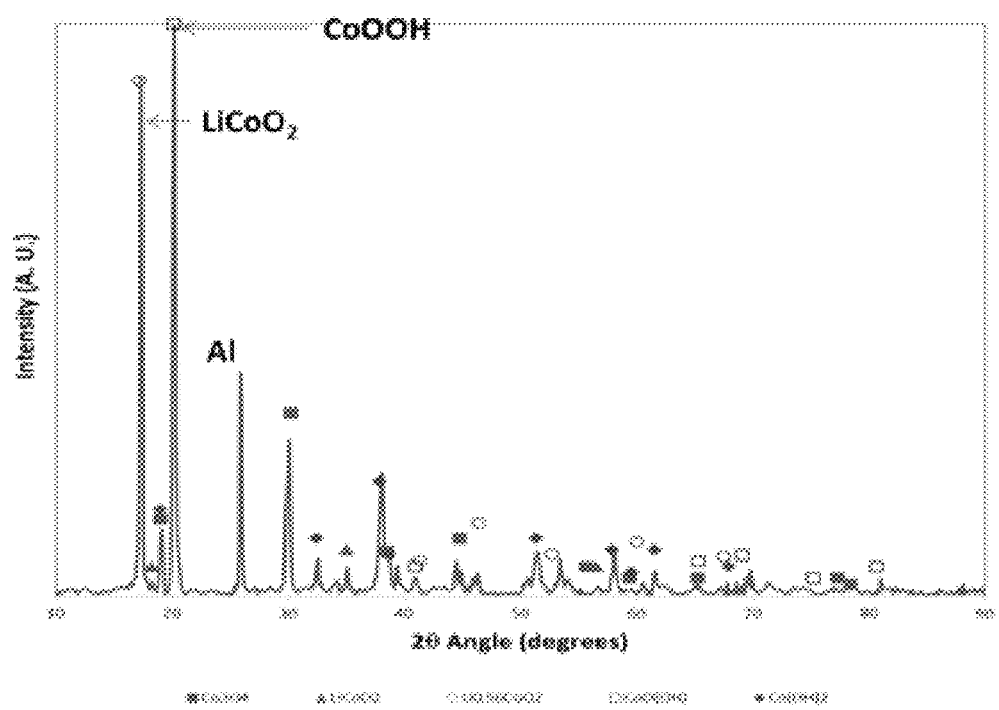
FIG. 4 is a graph showing the X-ray diffraction pattern of the positive electrode according to one embodiment of the invention.

As shown in FIG. 4, an X-ray diffraction pattern of the as-prepared positive electrode confirms the formation of lithium cobalt oxide and cobalt oxyhydroxides having both $Co^{+3}$ and $Co^{+4}$ oxidation states.

Figure 5:
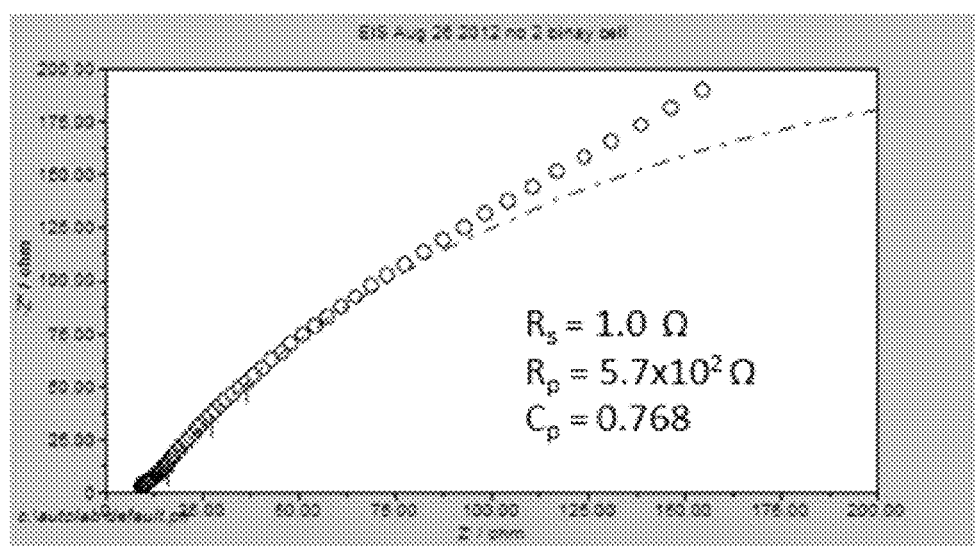
FIG. 5 is a graph of electrochemical impedance spectroscopy (EIS) showing the charge transfer resistance measurement of the positive electrode. The charge transfer resistance value is 570 Ohms for the positive electrode vs. Lithium cell. The measurement was performed on an Autolab potentiostat.
Figure 6:
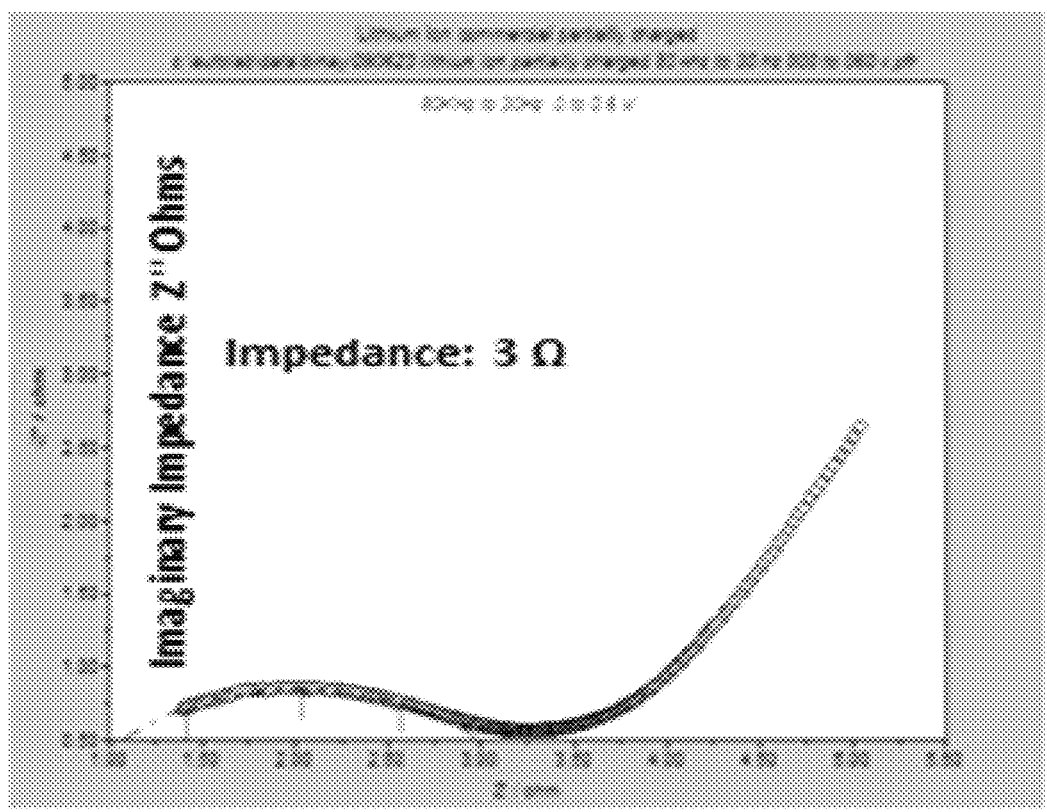
FIG. 6 is a graph of electrochemical impedance spectroscopy (EIS) showing the charge transfer resistance measurement of a commercial lithium rechargeable cell. The charge transfer resistance value is 3 Ohms for the commercial lithium rechargeable cell. The measurement was performed on an Autolab potentiostat.
Figure 7:
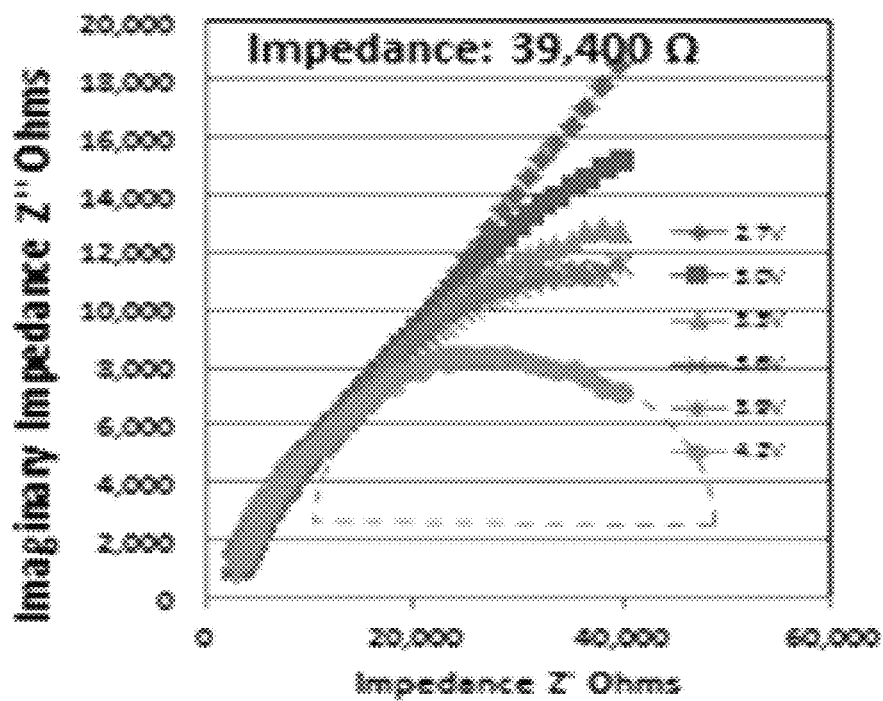
FIG. 7 is a graph of electrochemical impedance spectroscopy (EIS) showing the charge transfer resistance measurement of a positive electrode lacking cobalt oxyhydroxide layers between the polymer layers. The charge transfer resistance value is 39,400 Ohms for the positive electrode lacking cobalt oxyhydroxide layers between the polymer layers. The measurement was performed on a CHI potentiostat.

In one embodiment, the as-prepared positive electrode may be tested for performance. The impedance of the positive electrode was measured (FIG. 5) and compared with that of a commercial product (FIG. 6) and with that of a control experiment (FIG. 7). The control experiment may be a positive electrode lacking conductive agents and active materials. As shown in FIGS. 5-7, although the impedance value (570Ω) of the positive electrode is higher than that of the commercial cell (3Ω), a significant improvement has been made as compared to that of the control experiment (39400Ω).

Figure 8:
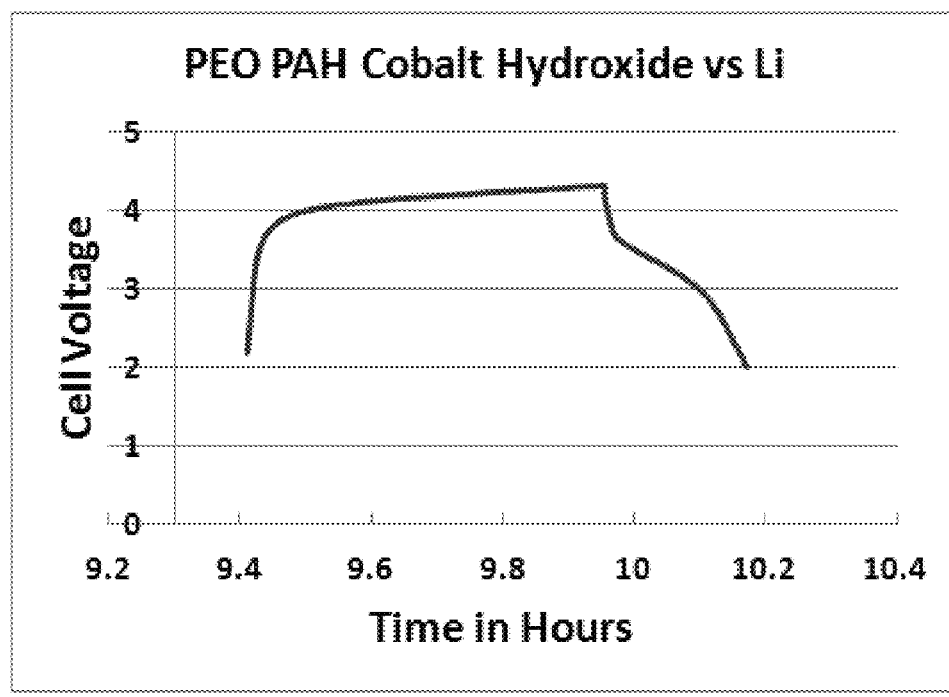
FIG. 8 is a graph showing the performance of the positive electrode vs. lithium cell. At a high rate charge and discharge ($3.5 \times 10^{-5}$ Amps), the columbic efficiency is about 30%.
Figure 9:
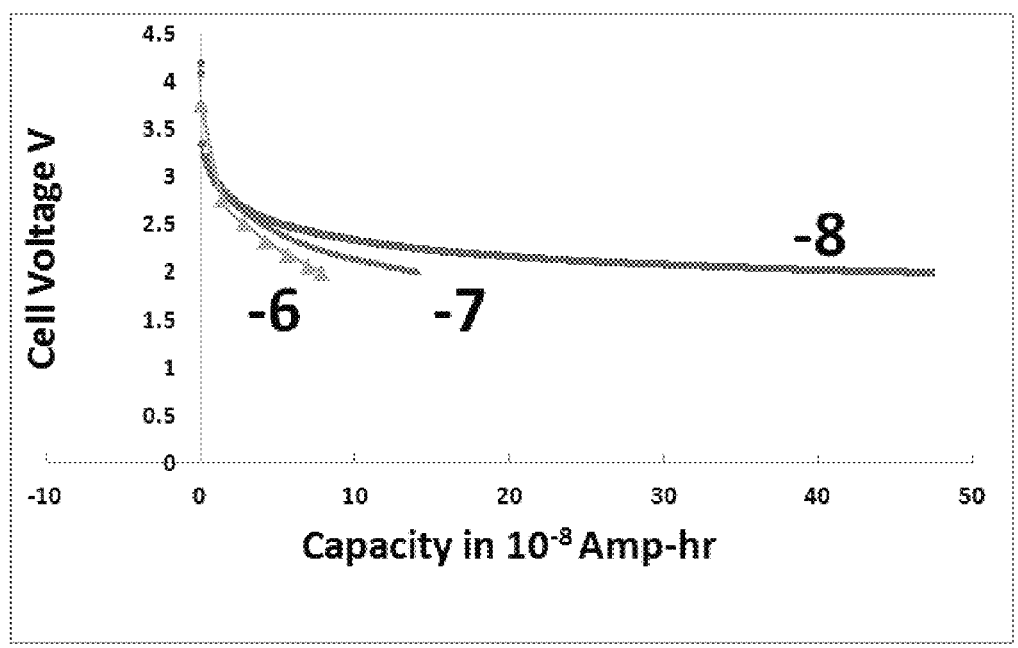
FIG. 9 is a graph showing the discharge curves at three different rates for the positive electrode vs. Lithium cell. The $10^{-8}$, $10^{-7}$ and $10^{-6}$ Amp currents are abbreviated as $-8$, $-7$, and $-6$, respectively. High rate is easily sustained with a large capacity.
Figure 10:
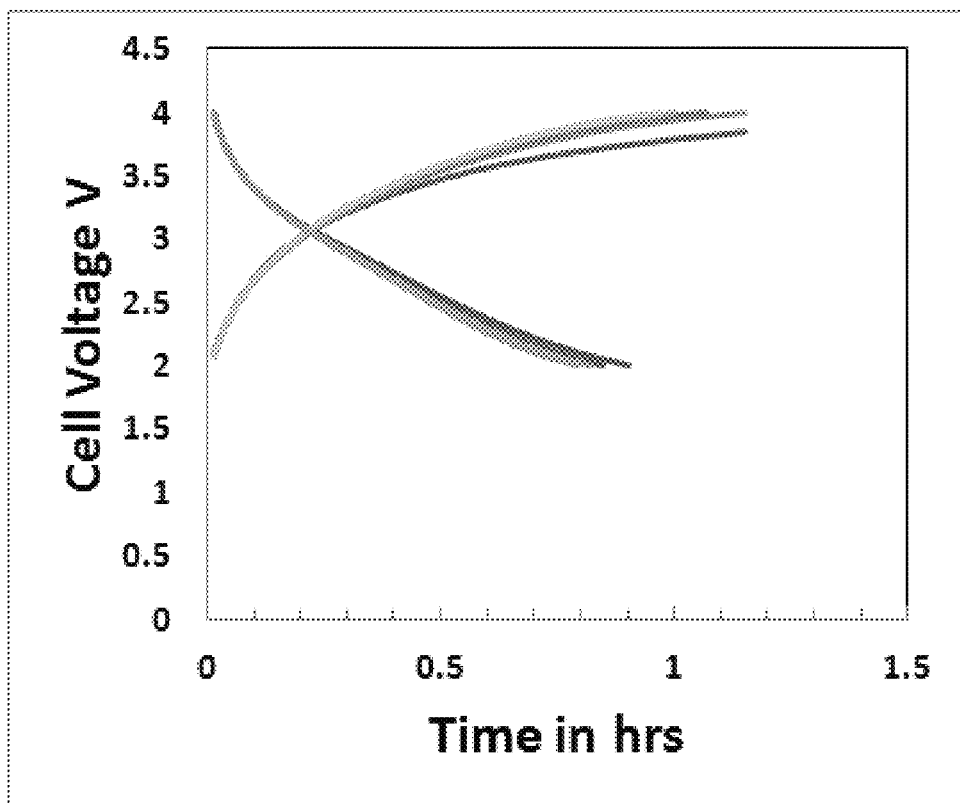
FIG. 10 is a graph showing the charge/discharge profile of the positive electrode at $3.5 \times 10^{-6}$ Amps. The columbic efficiency is approximately 80%.

In another embodiment, the as-prepared positive electrode shows a good battery performance. For example, a cell battery including the positive electrode using lithium as an anode may show high efficiency values. Compared with a traditional cell battery, no carbon-based materials are needed for conductivity for the positive electrode in the present invention. At a high charge and discharge rate of $3.5 \times 10^{-5}$ Amps, the columbic efficiency of the cell battery may be about 30% (FIG. 8). Such a high rate may be easily sustained with a large capacity (FIG. 9). Further, at 0.7 C ($3.5 \times 10^{-7}$ Amp) the cell battery shows over 90% efficiency (FIG. 11) and at 7 C ($3.5 \times 10^{-6}$ Amps) the cell battery shows about 80% efficiency (FIG. 10). The battery charge/discharge curves show that adequate conductivity exists within insulating polymers PEO and PAH layers.

In one specific embodiment, a cell battery including the positive electrode and using lithium as an anode shows an excellent specific capacity. As shown in Table 2, the overall specific capacity is calculated as 164±46.5 mA-hrs/g, higher than the maximum value experimentally obtained of 137 mA-hrs/g. Applicants envision that the existence of capacitance in the positive electrode may contribute to the excess of the specific capacity. The capacitance contribution of an electrode made from an LBL process has been described by Lee et al. [Lee, S. W., Naoaki Yabuuchi, et al. (2010)]. Wang et al. further described that the capacitance contribution is particle size-dependent and it may increase significantly as the particle size approaches 10 nanometer or less [J. Wang; J. Polleux; et al. (2007)].

TABLE 2

Specific capacity values of the positive electrode.

| Category | Value | Units |
|---|---|---|
| Mass | 4.74 ± 0.81 | μg |
| Capacity | 7.5 ± 2.5 | $\times 10^{-7}$ A-hrs |
| Specific Capacity | 164 ± 46.5 | mA-hrs/g |
| Capacitive Contribution | 54 | mA-hrs/g |
| Final Specific Capacity | 110 | mA-hrs/g |

Figure 12:
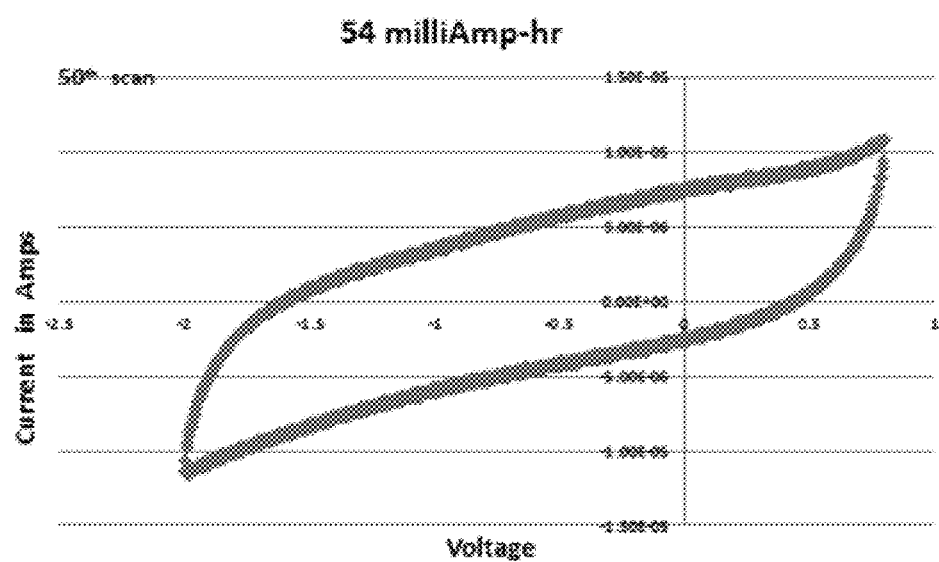
FIG. 12 is a graph showing a CV curve of a positive electrode lacking the active material of $LiCoO_2$. The contribution of the non-active material to the specific capacity was determined as 54 mA-h/g.

As shown in FIG. 12, a CV curve of a multilayer positive electrode lacking the active and conductive materials shows that the capacitive contribution was determined as 54 mA-hrs/g.

In the present invention, the nano-sized active and conductive materials within a multilayer structure of the positive electrode may contribute to its excellent battery performance and supreme specific capacity.

In one embodiment, the present invention may be applicable to any lithium ion cathodes that use metal oxides or any other active materiel, e.g., $LiFePO_4$. In another embodiment, the present invention may be applicable to any sodium and potassium ion batteries. In another embodiment, the present invention may be applicable to all secondary and primary batteries in which carbon may be added to their electrodes.

In another embodiment, the present invention may be applicable to any batteries using aqueous, non-aqueous and ionic liquid electrolytes.

In another embodiment, the present invention may be applicable to any flow batteries, capacitors, sensors and other electrochemical devices.

In another aspect, the present invention relates to a method for producing an electrochemical device, e.g., a conductor or a positive electrode. In one embodiment, the method comprises the steps of: a) making aqueous solutions of an anionic polymer, cobalt hydroxide, and a cationic polymer; b) immersing a first metal substrate in the anionic polymer solution; c) immersing the first metal substrate in the cobalt hydroxide solution; d) immersing the first metal substrate in the cationic polymer solution; e) repeating steps b)-d) for a desired number of times to form a multilayer structure on the first metal substrate having repeatable layers of the anionic polymer, cobalt hydroxide, and the cationic polymer; f) oxidizing cobalt hydroxide into cobalt oxyhydroxide wherein cobalt has +3 oxidation state; and g) chemically producing a layer including an active material and a conductive agent of cobalt oxyhydroxide wherein cobalt has both +3 and +4 oxidation states.

The first metal substrate may include any stable metals as discussed above. The polymers may be used as insulators. The polymers may include any non-conductive anionic and cationic polymers as discussed above. The second metal substrate may include any active metal providing metal ions for battery. In one embodiment, the second metal substrate may be lithium. In another embodiment, the second metal substrate may be sodium or potassium.

In one specific embodiment of the present invention, the active material is lithium cobalt oxide.

In another specific embodiment of the present invention, the conductive agents are cobalt oxyhydroxides having both $Co^{+3}$ and $Co^{+4}$ oxidation states.

In one embodiment, the method for producing a positive electrode as discussed above wherein step g) may comprise electrochemically producing the chemical layer. Further, step g) may comprise building an electrolytic cell under an air-free condition by using the multilayer structure on the metal substrate having cobalt oxyhydroxide with +3 oxidation state as the cathode and by using a second metal substrate as the anode. In one specific embodiment, the second metal substrate is lithium. In another specific embodiment, step g) may comprise electrochemically producing the layer having active materials and conductive agents under an air-free condition.

In one specific embodiment, the conductive agent of cobalt oxyhydroxide having both +3 and +4 oxidation states is produced when the electrolytic cell is charged at least at a rate of C/5.

In another specific embodiment, lithium cobalt oxide is produced when the electrolytic cell is discharged at about 3V.

In another embodiment, the method for producing a positive electrode as discussed above wherein step f) may comprise oxidizing cobalt hydroxide in air.

In another embodiment, the method for producing a positive electrode as discussed above wherein each of the steps b)-d) may further comprise washing the first metal substrate with water.

In one embodiment, because the as-prepared conductive agents, e.g., cobalt oxyhydroxide having both $Co^{+3}$ and $Ce^{+4}$ oxidation states, show significant improvements in conductivity, Applicants envision that the present invention may be applicable to electronic conductors for any electrochemical devices. An electronic conductor using cobalt oxyhydroxide may have many significant advantages over carbon, such as stability and non-inflammability, lower price, and others.

Figure 18:
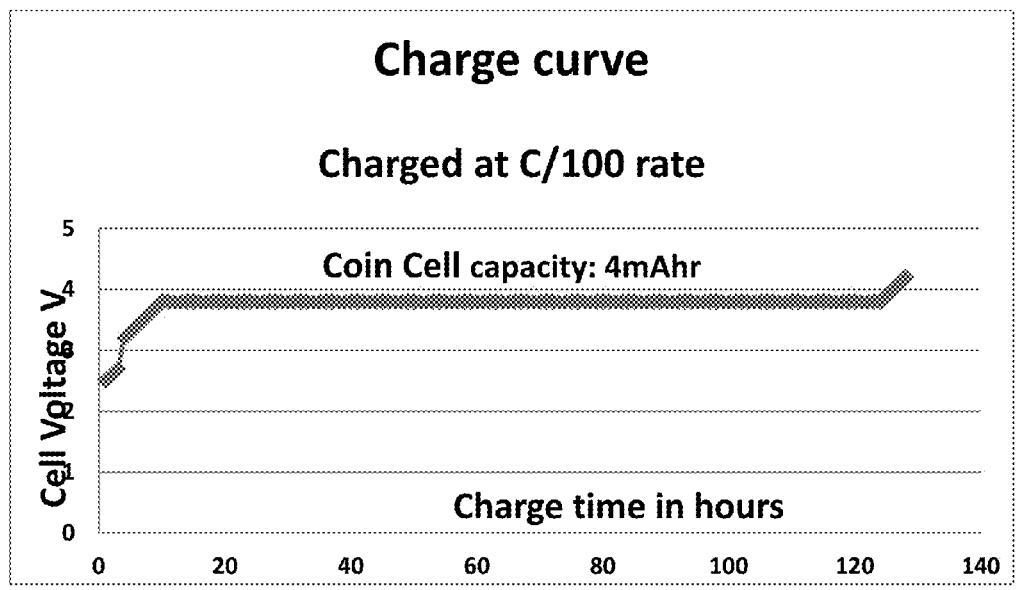
FIG. 18 is a graph showing the charge curve of a coin cell with CoOOH as a conductive agent. The experimental cathode was made by pasting 90/5/5 of LiCoO$_2$/CoOOH/Pvdf. It was made exactly the same as the standard cathode with CoOOH replacing carbon. No other change was made in the processing of the electrode. Electrode thickness is 10 to 15 millimeters. The substrate is Aluminum as in a standard cell. The counter electrode is lithium and the electrolyte is 1M LiPF$_6$. The coin cell was charged at C/100 rate. The coin cell capacity was measured as 4 mAhr.
Figure 19:
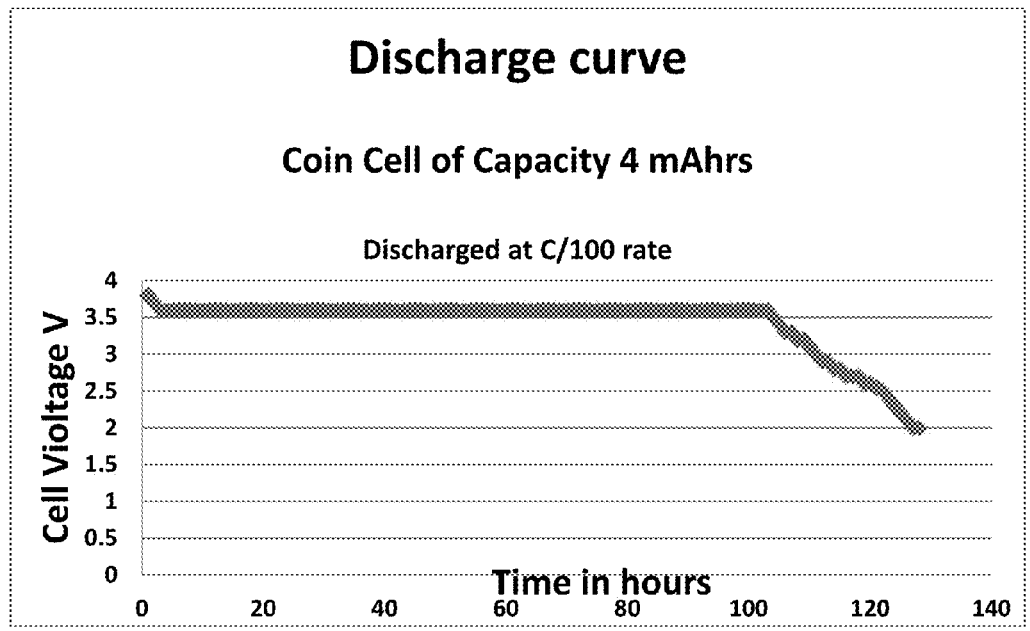
FIG. 19 is a graph showing the discharge curve of a coin cell with CoOOH as a conductive agent. The experimental cathode was made by pasting 90/5/5 of LiCoO$_2$/CoOOH/Pvdf. It was made exactly the same as the standard cathode with CoOOH replacing carbon. No other change was made in the processing of the electrode. Electrode thickness is 10 to 15 millimeters. The substrate is Aluminum as in a standard cell. The counter electrode is lithium and the electrolyte is 1M LiPF$_6$. The coin cell was discharged at C/100 rate. The coin cell capacity was measured as 4 mAhr.
Figure 20:
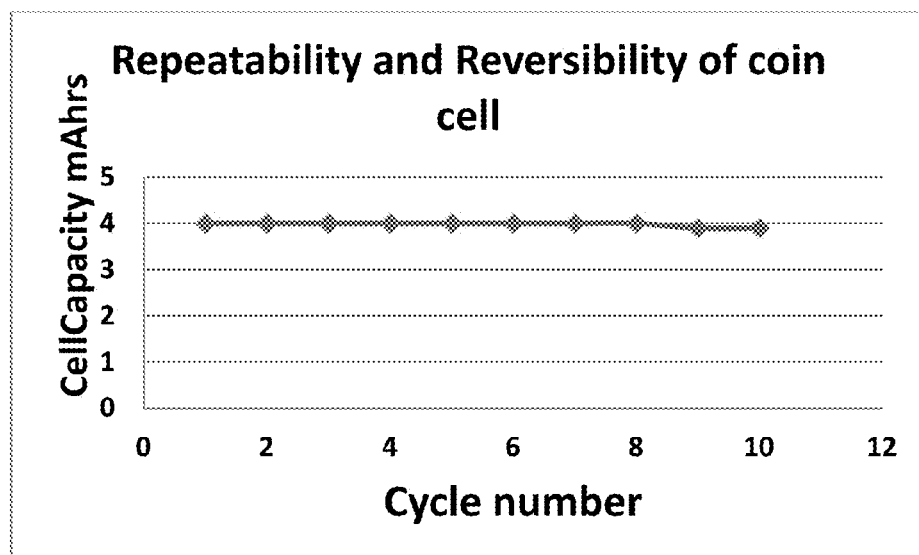
FIG. 20 is a graph showing repeatability and reversibility of the coin cell.

In one embodiment, the present method or process may be used to improve efficiency of the commercial cells. For example, the present conductive agents, e.g., cobalt oxyhydroxide having both $Co^{+3}$ and $Co^{+4}$ oxidation states, show significant improvements in conductivity can be used instead of carbon in the commercial cells. Applicants demonstrate that cobalt oxyhydroxide having both $Co^{+3}$ and $Co^{+4}$ oxidation states may be used to improve performance of the commercial cells such as beaker cells (FIGS. 16-17) or coin cells (FIGS. 18-20).

EXAMPLES

The following Examples have been presented in order to further illustrate the invention and are not intended to limit the invention in any way.

Example 1

Multilayer Film Structures

Applicants used Decher's method to make multiple (e.g., 20) layers of Poly(Allylamine) Hydrochloride (PAH), Cobalt Hydroxide and Poly(ethylene) Oxide (PEO) film using an LBL machine from StratoSequence VI NanoStrata Inc. The drying process after each layer was performed with forced nitrogen for 10 seconds. Solutions were prepared by dissolving the respective powders in DI water. The composition was shown as PEO: 70 mg/100 cc; PAH: 100 mg/100 cc; Cobalt Hydroxide: 200 mg/100 cc. PEO was supplied by Polysciences, Inc. (catalog number 04030), PAH from Alfa Aesar (stock number 43092) and Cobalt Hydroxide from Alfa Aesar (stock number 12524).

PEO and PAH polymers were made in dilute solutions having a concentration of 0.01M. A metal substrate, generally aluminum, was immersed in one polymer solution, PEO and then in the solution of DI water. Next the electrode was immersed in the solution of cobalt hydroxide. A DI water rinse was performed before the electrode was further immersed into a solution of the second polymer, PAH. After another DI-water rinse, the first cycle was complete and a first repeatable layer was formed (FIG. 2a). By the time the electrode reached the cobalt hydroxide solution it already had a tenacious layer of PEO on it. The cobalt hydroxide, $Co(OH)_2$ is immobilized within the polymers. The above steps may be repeated for many times until a desired number of the repeatable layers are obtained.

Example 2

In Situ Preparation of the Positive Electrode

Preparation of lithium cobalt oxide. Because of the thickness of the films, introducing large-sized solid $LiCoO_2$ into the film multilayers is very difficult. An alternative way is to convert the $Co(OH)_2$ inside the film to lithium cobalt oxide, $LiCoO_2$. The apparatus as shown in FIG. 3 was used to perform the conversion. The electrochemical process was performed under an air-tight condition, such as an argonpurged glove box. A test cell was set up with the cathode as copper electrode to which was straddled a sack of copper screen inside which discs of prepared electrodes were enclosed. Metal lithium was used as the anode. The electrolyte used was similar to those in traditional lithium ion batteries. For example, a 50% mix of EC/DMC (Ethylene Carbonate/Dimethyl Carbonate) was used as the solvent. In the solvent 0.1 M $LiPF_6$ was dissolved. A constant current discharge was performed at 3 volts for 2 hours. This voltage is close to the standard electrode potential of $LiCoO_2$ (3.6V). The process was performed at room temperature and no heating procedure was involved. An X-Ray diffraction pattern was to confirm the presence of $LiCoO_2$ (FIG. 4).

Preparation of cobalt oxyhydroxide. In the above electrochemical process, Applicants used a solvent including a mixture of ethylene carbonate and dimethyl carbonate (EC/DMC=1/1). The salt $LiPF_6$ (1M) was added into the mixture. The electrolyte was used in a much higher voltage range of 0 to 4.5 V. This was much larger than 1.25 volts for an alkaline nickel cadmium battery. However if the change of oxidation states of the $Co(OH)_2$ and CoOOH were expected to be independent of the solvents used—aqueous or non aqueous, it should be possible to produce CoOOH by oxidation of $Co(OH)_2$ even in a non-aqueous environment. Once produced, it can be converted to the electronically conducting form which contains $Co^{+4}$ in addition to the $Co^{+3}$. Typically the unconverted form of the CoOOH has only $Co^{+3}$ only. We know from the aqueous alkaline battery that if the charge rate is higher than C/5 with respect to $Co(OH)_2$ then there is a good likelihood of obtaining the $Co^{+4}$ in addition to $Co^{+3}$. With this understanding we expect that CoOOH can be produced in a non-aqueous environment and also be converted to the electronically conducting state, provided that the first charge cycle is greater than C/5 rate.

The multilayer structure from LBL having CoOOH was produced by oxidation in air while the electrode was drying. Later CoOOH was electrochemically converted to a mix of +3/+4 forms during the first cycle of the battery charging. Normally the charge current we have used was $10^{-5}$ Amps in a constant current mode. With respect to $Co(OH)_2$, which has a mass of approximately 15 μgms, the charge rate would be ≈13.6 C. The material of $Co(OH)_2$ has a specific capacity of 298 mA-hrs/gm. The rate to which $Co(OH)_2$ was subject was much higher than the C/5 required. At such high rates of charge and discharge (13.6 C), a highly disturbed structure is likely to be produced because of the diffusion limitations in the solid state. Hence, CoOOH in which cobalt has +4 and +3 oxidation states is likely to form. The X-Ray diffraction pattern of the product proved the presence of the CoOOH in which cobalt has +4 and +3 oxidation states. Importantly, the results from the battery charge/discharge test indicate a high conductivity of the resulting positive electrode.

Example 3

Determination of Mass and Specific Capacity of $LiCoO_2$

The mass of $LiCoO_2$ produced during the treatment in the glove box on the electrodes was determined using inductively-coupled plasma (ICP) mass spectrometry. First, the total amount of cobalt on the electrode surface was determined. The X-Ray diffraction pattern among with an analysis using Jade software gives the proportion of the compounds with cobalt in it. The weight of $LiCoO_2$ was determined to be 4.74 micrograms. Then the specific capacity was calculated as shown in the Table 2. As noted below, the mean specific capacity was found as 164 mA-hr per gram. A large standard deviation was σ=46.5 mA-hrs per gram associated with the mean value.

Example 4

Impedance: Electrochemical Impedance Spectroscopy

Electrochemical Impedance Spectroscopy (EIS) has been used in battery research for several decades. More recently, study of lithium ion cells have proliferated, motivated by the desire to measure kinetic and transport properties and to characterize structural degradation leading to losses in capacity (Pistoia, Li, et al., 1992); Laman, Matsen, et al., 1986; Bohnke, Bohnke, et al., 1993; Laman, Matsen, et al., 1986; Cahan, Daroux, et al., 1989; Gabrielli, 1995; Macdonalds, 1987; Bhakta, Macdonald, et al., 1991). One limitation of EIS study was the difficulty of interpreting the impedance data. Battery impedance data are impacted by a complicated set of processes including porous electrode effects, the superposition of the separator and two electrode impedance responses, transient and non-linear responses and the additional artifacts of the battery current collectors, terminal and other peripherals (Farcy, Messina, et al., 1990; Pistoia, Li, et al., 1992; Laman, Matsen, et al., 1986; Bohnke, Bohnke, et al., 1993; Laman, Matsen, et al., 1986; Cahan, Daroux, et al., 1989; Gabrielli, 1995; Macdonalds, 1987). All these phenomena make interpreting full battery impedance data a difficult task. The approach taken in the past has nearly been to fit data to an equivalent circuit composed of passive and frequency dependent circuit elements. Both simple and lumped parameter circuits and more complex finite transmission line circuits have been used (Macdonalds, 1987; Bhakta, Macdonald, et al., 1991; Macdonald, Urquidi-Macdonald, et al., 1991; Grahame 1952; Orazem, Agarwal, et al., 1994; Bard and Faulkner). One disadvantage of this approach is the difficulty in interpreting the equivalent circuit parameters in terms of fundamental properties.

We performed EIS on electrodes within a button cell construction. The FIG. 6 and FIG. 7 were shown for a commercial cell and for a cell with a cathode without cobalt oxyhydroxide. Compared to the commercial cell the impedance value of the multilayer positive Cathode/Li cell was still much higher (570Ω vs. 3Ω). However, significant improvement has been made compared to a cell without active materials and conductive agents in the cathode (570 Ω vs. 39400Ω).

Example 5

Battery Tests

All newly made batteries were given 5 formation cycles. Typically, the battery tests were performed at $3.5 \times 10^{-5}$ Amps Charge and $3.5 \times 10^{-7}$ Amps discharge with no rest in between. The detailed steps for battery tests are shown as follows:

Discharge at $3.5 \times 10^{-5}$ Amps to 0.5 Volts;
Give a rest for 30 minutes;
Charge at $3.5 \times 10^{-7}$ Amps to a voltage cut off between 4 and 4.2 Volts;
Give a 5 minutes rest;
Do a discharge at $3.5 \times 10^{-7}$ Amps to 2.0 Volts;

The Charge and Discharge were done at $3.5 \times 10^{-5}$, $3.5 \times 10^{-6}$ and $3.5 \times 10^{-7}$ Amps; and Repeat the 1-5 steps for the number of cycles desired to run.

Charge cut off voltage. Typically, the charge cut off voltage in a lithium ion battery with $LiCoO_2$ as cathode was 4.2 volts. Taking the standard electrode potential as 3.7 V, an over potential of 0.5 V was expected. In the first five formation cycles the charge cut off voltage was 4.2 V. The typical charge current was $3.5 \times 10^{-5}$ Amps. During battery characterization, a lower charge current of $3.5 \times 10^{-7}$ Amps was used. It became necessary to lower the charge cut off voltage, as the voltage at the $3.5 \times 10^{-7}$ Amps charge plateaus was near 4.0 V. Later during characterization of the battery at different discharge rates, a lower charge cut off voltage of 4.0 V was used. We did not observe any changes in capacity of the battery as a result of lowering the cut off voltage form 4.2 to 4.0 V.

Figure 11:
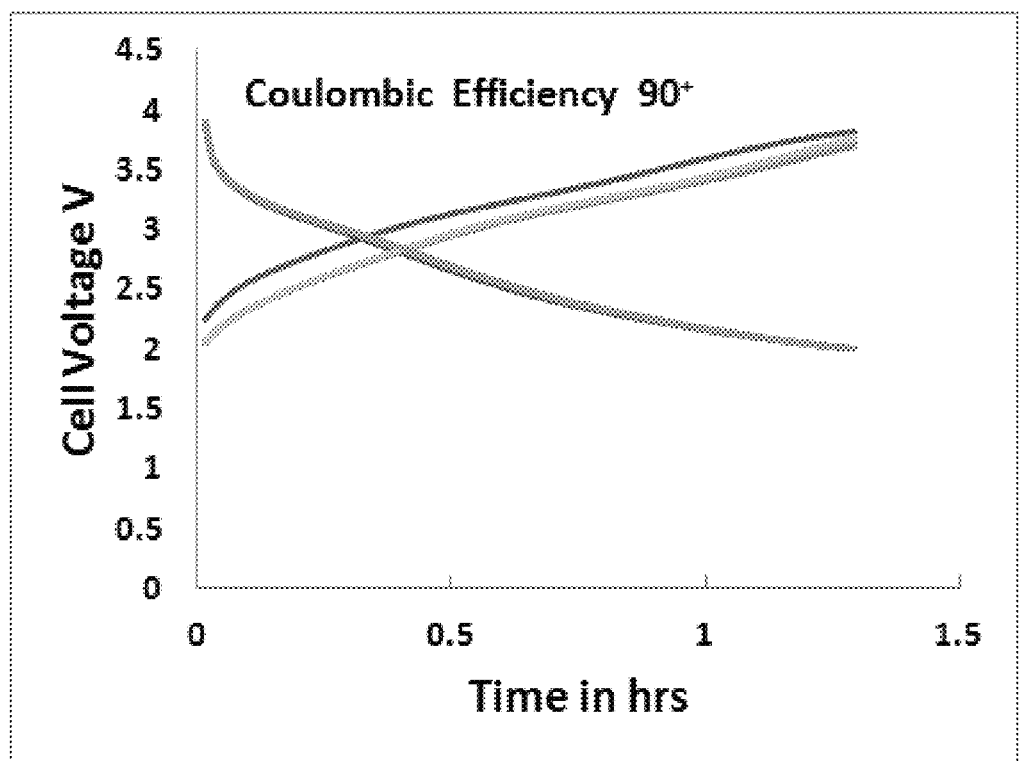
FIG. 11 is a graph showing the charge/discharge profile of the positive electrode at $3.5 \times 10^{-7}$ Amps. The columbic efficiency is at least 90%.

Battery Performance. On examining battery charge/discharge data we observed that the cells show high efficiency values. The columbic efficiencies range from 80 to over 90 percent (FIGS. 9-11). At 0.7 C ($3.5 \times 10^{-7}$ Amp), the battery shows over 90% efficiency and at 7 C ($3.5 \times 10^{-6}$ Amps) the battery shows about 80% efficiency (FIGS. 10 & 11). High rate was easily sustained with a large capacity as evidenced by the rate plot (FIG. 9). At the high rate of $3.5 \times 10^{-5}$ Amps charge and discharge FIG. 8 shows that the columbic efficiency was about 30%.

Example 6

Mass and Specific Capacity

Table 2 shows that the as-produced positive electrode having $LiCoO_2$ was analyzed for mass and specific capacity. The fact that the cathode with $LiCoO_2$ performs at high efficiency bears testimony to the conductive situation within the cathode. We have produced a conductive species of cobalt oxyhydroxide (CoOOH). No carbon was used on the electrode to provide conductivity. The cobalt oxyhydroxide was sufficient. The battery charge/discharge curves showed that adequate conductivity exists within the fold of the two insulating polymers PEO and PAH used. We can therefore conclude that the above process was successful in producing a positive cathode that performs reasonably to show battery activity.

Table 2 shows that the mean value of specific capacity is higher than 137 mA-hrs/g which is the maximum value obtained experimentally. It corresponds to a value of x=0.5 in $Li_xCoO_2$. To explain the excess above 137 mA-hrs/g (164±46.5 vs. 137) we hypothesize the presence of capacitance in the electrode.

Example 7

Capacitance Contribution

The capacitance contribution from an LBL electrode has also been shown by others (Lee, Seung Woo, Naoaki Yabuuchi, et al., 2010). This contribution was particle size-dependent, increasing significantly as particle size approaches 10 nm or less (John Wang, Julien Polleux, et al., 2007). We observed a similar contribution in our case (54 mA-h/gm).

Table 2 shows the capacitance contribution to the value of specific capacitance of lithium cobalt oxide. If we take the $-\sigma$ we will arrive at a value of 117.5 mA-hrs/g, which was within the acceptable range. But taking +a this value became 210.5 mA-hrs/g. This was far beyond the value of 137 mA-hrs/g. Hence, we consider capacitive contribution on the value of the mean only. A statistical analysis performed shows that the distribution curves are non-parametric. The mean value was then the expected value and the 1 sigma variations can be narrowed with a larger sample size.

Example 8

Discussion

Literature suggests that nanoparticles (NPs) immobilized between LBL layers is the focus of high research activity (Alkire, et al.). Distinction between faradaic and non-faradaic (double layer) charging is the key to understanding how to make all metal centers in NPs redox active. The ability to have charge compensation capability enhanced resides in how NPs are immobilized. The transfer of charge through the film is limited to a small number (30) of layers (Alkire, et al.). Beyond this number of the order, as suggested by Decher, the transfer of charge becomes "FUZZY" (Decher, 1997). This phenomenon prevents charge transfer through the LBL film.

Immobilized NPs participate in a new area of electrochemistry of discrete electro-active Nano particles. "These NPs are different from their material counter parts in: (1) the possibility of observing a significant fraction of the redox process for a given NP to originate from interfacial redox sites (which may have intrinsically faster electrons transfer and ionic compensation processes, (2) the possibility of shorter times required for charge compensating ions to access all of the electro-active sites in the NP, (3) the significantly enhanced surface areas of the NPs, which allow for more entry points for these same ions, as well as providing more active sites for cases in which surface structures on the NPs are involved in electro-catalytic processes (Alkire, et al.). While the phenomenological observations of faster redox processes for electro-active NPs compared to bulk materials and higher electro-catalytic activity described above can certainly be explained on the basis of these types of phenomena, much work remains to characterize and more fully exploit these phenomena."

We had immobilized two types of nano particles within the LBL films. One was $LiCoO_2$ and the other was CoOOH. The distance between the films was not more than 4 atomic layers. At such a level, charge transfer between redox active particles, namely $LiCoO_2$, occurs in a similar manner as described above. The nature of the LBL structure makes the NPs into a close proximity to one another. Thus, for cases where the NPs are electroactive, charge propagation through the films seems most likely to occur by electron exchange, first between the electrode and the layer of NPs closest to the electrode surface and then by electron exchange between the NPs in the film. The CoOOH NPs provide additional conductivity. The net result was a highly efficient positive cathode with columbic efficiencies reaching near 90% when the cut off voltage was 2.0 Volts. Higher efficiencies may be realized at a lower cut off voltage when the voltage was lowered. A logical cut off can be 1.0 V which was safely distant from the reported corrosion plateau of 0.5 Volts during discharge (Dey, 1971).

The obtained specific capacity value of 164 mA-hrs/g was also in excess of 137 mA-hrs/g, the maximum value corresponding to x=0.5 in $Li_xCoO_2$. Generally the value of x does not exceed 0.5. The excess was now explained by the onset of capacitance in the battery. These high values of specific capacity were due to the contribution of nanoparticles. The capacitive contribution calculation was shown in Table 2.

We have shown that a high performance lithium ion battery can be fabricated using polymer films. Nanoparticles were deposited within the films and later treated to produce the electronic conductor and the active material. Thus, we were able to produce a LBL positive cathode. The positive electrode demonstrates a very high efficiency, high specific capacity and high capacitance. The capacitor in the battery contributes to coulombs or additional current especially at the very high rates. The pretreatment was crucial to develop a positive electrode showing high capacity and high rate capability. This present method holds promise of very high energy density and very high power density co-existing in one device.

It also expands the application of materials and techniques to other areas of electrochemistry. For instance, the electronically conducting CoOOH can be used in other non-aqueous electrochemical systems for sensors, catalytic and energy producing devices, including lithium ion cathodes of mixed oxides ($LiNi_{1/3}Mn_{1/3}CO_{1/3}O_2$, etc.) and $LiFePO_4$. The in situ method for producing nanoparticles of lithium cobalt oxide can be extended to other lithium cathode systems and other places for deposition of nanoparticles. Appearance of capacitive contribution to capacity by nanoparticles can be useful in all areas of energy production.

Finally it shows promise of a hybrid device: a battery and a capacitor working together.

Example 9

Commercial Cell Applications

Applicants showed that the present invention can be applicable for commercial cells. FIGS. 16-20 demonstrated that the present method or process can be used to improve the performance of commercial cells.

Figure 16:
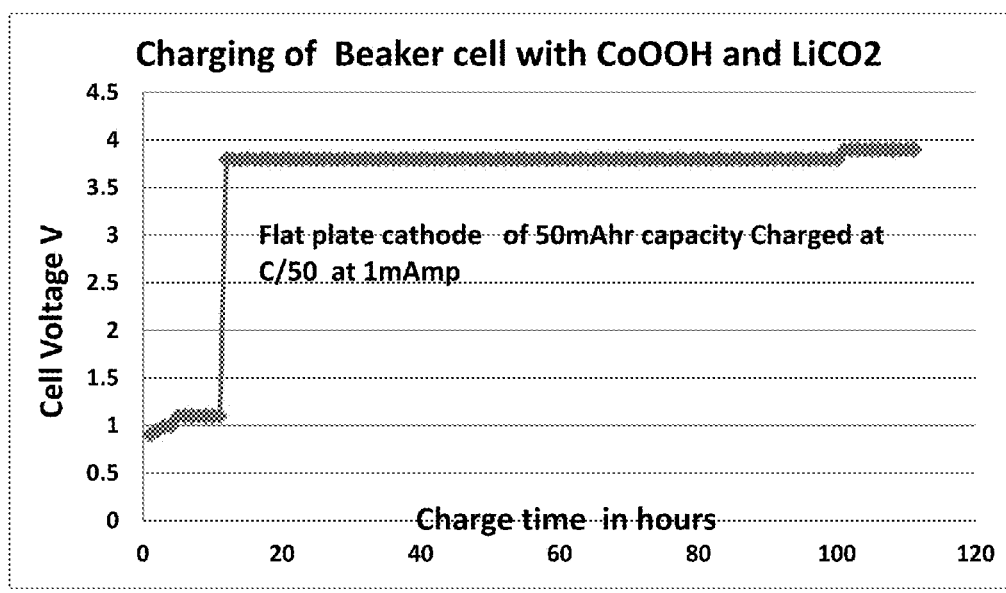
FIG. 16 is a graph showing the performance of CoOOH as a conductive agent in charging of beaker cell including CoOOH and LiCoO$_2$, one example of commercial cell applications. The experimental cathode was made by pasting 90/5/5 of LiCoO$_2$/CoOOH/Pvdf. It was made exactly the same as the standard cathode with CoOOH replacing carbon. No other change was made in the processing of the electrode. Electrode thickness is 10 to 15 millimeters. The substrate is Aluminum as in a standard cell. The counter electrode is lithium and the electrolyte is 1M LiPF$_6$.

FIG. 16 is a graph showing the performance of CoOOH as a conductive agent in charging of beaker cell including CoOOH and $LiCoO_2$, one example of commercial cell applications. The experimental cathode was made by pasting 90/5/5 of $LiCoO_2$/CoOOH/Pvdf. It was made exactly the same as the standard cathode with CoOOH replacing carbon. No other change was made in the processing of the electrode. Electrode thickness is 10 to 15 millimeters. The substrate is Aluminum as in a standard cell. The counter electrode is lithium and the electrolyte is 1M $LiPF_6$.

Figure 17:
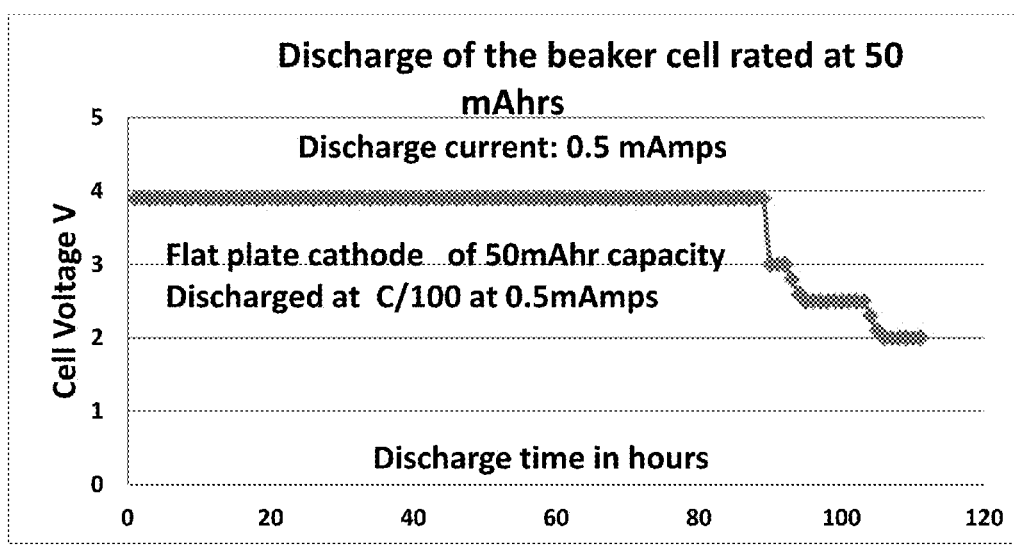
FIG. 17 is a graph showing discharge of the beaker cell as shown in FIG. 16. The beaker cell was discharged at a rate of C/100. Discharge current was 0.5 mAmps.

FIG. 17 is a graph showing discharge of the beaker cell as shown in FIG. 16. The beaker cell was discharged at a rate of C/100. Discharge current was 0.5 mAmps.

FIG. 18 is a graph showing the charge curve of a coin cell with CoOOH as a conductive agent. The experimental cathode was made by pasting 90/5/5 of $LiCoO_2$/CoOOH/Pvdf. It was made exactly the same as the standard cathode with CoOOH replacing carbon. No other change was made in the processing of the electrode. Electrode thickness is 10 to 15 millimeters. The substrate is Aluminum as in a standard cell. The counter electrode is lithium and the electrolyte is 1M $LiPF_6$. The coin cell was charged at C/100 rate. The coin cell capacity was measured as 4 mAhr.

FIG. 19 is a graph showing the discharge curve of a coin cell with CoOOH as a conductive agent. The experimental cathode was made by pasting 90/5/5 of $LiCoO_2$/CoOOH/Pvdf. It was made exactly the same as the standard cathode with CoOOH replacing carbon. No other change was made in the processing of the electrode. Electrode thickness is 10 to 15 millimeters. The substrate is Aluminum as in a standard cell. The counter electrode is lithium and the electrolyte is 1M $LiPF_6$. The coin cell was discharged at C/100 rate. The coin cell capacity was measured as 4 mAhr.

FIG. 20 is a graph showing repeatability and reversibility of the coin cell.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

1. V Pralong, A. Delahyaye-Vidal, B. Beaudoin, J-B Leriche, and J. M. Tarascon, *Journal of the Electrochemical Society*, 147 (4) 1306-1313 (2000).
2. P. Benson, G. W. D. Briggs and W. F. K. Wynne-Jones, *Electrochim. Acta*, 9, 275 (1964).
3. M. Butel, L. Gautier and C. Delmas, *J. Electrochemical Society*, 122, 271 (1999).
4. B. Huang, Y. I. Jang, Y. M. Chaing, D. R. Sadoway, *Journal of Applied Electrochemistry* 28 (1998) 1365-1369.
5. Lee, Seung Woo, Naoaki Yabuuchi, Betar M. Gallant, Shuo Chen, Byeong-Su Kim, and Paula T. Hammond. "High-Power Lithium Batteries from Functionalized Carbon-Nanotube Electrodes." *Nature Nanotechnology* 5 (2010): 531-537. © 2010
6. Advances in Electrochemical Science and Engineering Vol 11 Chemically Modified Electrodes. Edited by Richard C Alkire, Deiter M Kolb, Jasep Lipkowski and Philip N Ross.
7. Raimondi, F., Scherer, G. G., Koetz, R. and Wokaun, A. (2005) *Angewandte Chemie-International Edison*, 44, 2190.
8. Wieckowski, A. (2003) *Electrochemistry* (Tokyo, Japan), 71, 206
9. Daniel, M. G. and Astruc, D. (2004) *Chemical Reviews*, 104, 293.
10. Riley, D. J. (2002) Current Opinion in Colloid and Interfacial Science, 7, 186.
11. Murray, R. W. (2008) *Chemical Reviews* 108, 2688.
12. Bard, A. J., Ding Z. and Myung, N. (2005) Structure and Bonding Springer (Berlin, Germany), *Semiconductor Nanocrystals and Silicate Nano Particles*, vol 118, 1.
13. Chen, S. W. (2007) *Journal of Materials Chemistry*, 17, 4115.
14. Guyot-Sionnest, P. (2008) *Microchimica Acta* 160, 309.
15. Gero Decher, Fuzzy Nanoassemblies, *Science* 277, 5330 1232-1237, August 1997.
16. Vidotti, M., Silva, M. R., Salvador, R. P., Cordoba, De Torresi, S. I. and Dall'antonia, L. H. (2008) *Electrochimica*, Acta, 53, 4030.
17. Zhao, G., Feng, J. J., Zhang, Q.-L., Li, S. P. and Chen, H. Y. (2005) *Chemistry of Materials*, 17, 3154.
18. A. N. Dey, Electrochemical Alloying of Lithium in Organic Electrolytes, *Journal of the Electrochemical Society*, October 1971, 1547-1549.
19. John Wang; Julien Polleux; James Lim; Bruce Dunn; *J. Phys. Chem. C* 2007, 111, 14925-14931.
20. C. Ho, I. D. Raistrick and R. A. Huggins, *J. Electrochemical. Soc.*, 127, 343 (1980).
21. M. G. S. R. Thomas, P. G. Bruce, and J. B. Goodenough. *J. Electrochemical. Soc.*, 132, 1521 (1985).

22. B. V. Ratnakumar, C. Di. Stefano, and G. Nagasubsuramanian, and C. P. Bankston. *J. Electrochemical. Soc.,* 136, 6 (1989).
23. B. V. Ratnakumar, C. Di. Stefano, and C. P. Bankston. *J. Appl. Electrochem.,* 19, 813 (1989).
24. J. Farcy, R. Messina, and J. Pericon. *J. Electrochemical. Soc.,* 137, 1337 (1990).
25. G. Pistoia, L. Li, and G. Wang, *Electrochim. Acta,* 37, 63 (1992).
26. F. C. Laman, M. W. Matsen, and J. A. R. Stiles, *J. Electrochemical. Soc.,* 134, 2441 (1986).
27. Cl. Bohnke, O. Bohnke, and B. Vuillemin. *Electrochim. Acta,* 38, 1935 (1993).
28. F. C. Laman, M. W. Matsen, and J. A. R. Stiles. *J. Electrochemical. Soc.,* 134, 2441 (1986).
29. B. D. Cahan, M. L. Daroux and E. B. Yeager, *J. Electrochemical. Soc.,* 136, 1585 (1989).
30. C. Gabrielli, in *Physical Electrochemistry*, Chap. 6. I. Rubenstein, Editor. Marcel Dekker, Inc. New York (1995); Impedance Spectroscopy: Emphasizing Solid Materials and Systems. J. R. Macdonalds, Editor. John Wiley and Sons, Inc. New York (1987).
31. S. D. Bhakta, D. D. Macdonald, B. G. Pound, and M. Urquidi-Macdonald. J. *Electrochemical. Soc.,* 138, 1353 (1991).
32. D. D. Macdonald, M. Urquidi-Macdonald, S. D. Bhakta, B. G. Pound, J. *Electrochemical. Soc.,* 138, 1359 (1991).
33. D. C. Grahame. *J. Electrochemical. Soc.,* 99, 390C (1952).
34. M. E. Orazem, P. Agarwal, and L. H. Garcia-Rubio. *J. Electroanal. Chem.,* 378, 51 (1994).
35. Allen J. Bard and Larry R. Faulkner in *Electrochemical Methods Fundamentals and Applications*, second edition, John Wiley & Sons, Inc.

What is claimed is:

1. An electrochemical device comprising:
a positive electrode comprising (i) an active material comprising an alkali metal compound providing an alkali metal ion for an electrochemical reaction, and (ii) a conductive agent comprising particles of cobalt oxyhydroxide;
a negative electrode; and
a non-aqueous electrolyte
wherein the electrochemical device is a lithium ion battery, a sodium ion battery, or a potassium ion battery, and
wherein the active material is selected from the group consisting of lithium cobalt oxide, lithium iron phosphate, lithium manganese oxide, lithium nickel manganese cobalt oxide, lithium nickel cobalt aluminum oxide, lithium titanate, lithium vanadium oxide, lithium iron fluorophosphates, sodium iron phosphate, sodium iron fluorophosphates, sodium vanadium fluorophosphates, sodium vanadium chromium fluorophosphates, sodium hexacyanometallates, potassium hexacyanometallates, and lithium-containing layered compounds having hexagonal symmetry based on $\alpha$-NaFeO$_2$ structure with a space group of R3$^-$m.

2. The electrochemical device of claim 1 wherein:
the active material is lithium cobalt oxide.

3. The electrochemical device of claim 1 wherein:
at least some cobalt in the cobalt oxyhydroxide of the conductive agent has a +4 oxidation state.

4. The electrochemical device of claim 1 wherein:
at least some cobalt in the cobalt oxyhydroxide of the conductive agent has a +3 oxidation state.

5. The electrochemical device of claim 1 wherein:
the conductive agent comprises nanoparticles.

6. The electrochemical device of claim 1 wherein:
the active material and the conductive agent are supported on a substrate, and
the substrate comprises a metal selected from aluminum, copper, silver, iron, zinc, nickel, titanium, and gold.

7. The electrochemical device of claim 1 wherein:
the electrochemical device is a secondary battery.

8. The electrochemical device of claim 1 wherein:
the electrochemical device includes a cell operating at 2.0 to 4.5 volts.

9. The electrochemical device of claim 1 wherein:
the negative electrode comprises a negative electrode active material selected from lithium metal, alloys of lithium, silicon, and carbon.

10. The electrochemical device of claim 1 wherein:
the electrochemical device is a lithium ion battery.

11. The electrochemical device of claim 1 wherein:
no carbon is used in the positive electrode to provide conductivity.

12. The electrochemical device of claim 1 wherein:
the conductive agent is distributed throughout a bulk of the active material.

13. The electrochemical device of claim 1 wherein:
the electrochemical device includes a cell having a charge cut off voltage of 4.0 V or greater.

14. The electrochemical device of claim 1 wherein;
the cobalt oxyhydroxide is formed by oxidizing cobalt hydroxide.

* * * * *

UNITED STATES PATENT AND TRADEMARK OFFICE
CERTIFICATE OF CORRECTION

PATENT NO. : 9,997,777 B2  
APPLICATION NO. : 14/308019  
DATED : June 12, 2018  
INVENTOR(S) : Prasad et al.

Page 1 of 1

It is certified that error appears in the above-identified patent and that said Letters Patent is hereby corrected as shown below:

Column 8, Line 11, "LEO" should be --LEC--.

Column 14, Line 2, "$Ce^{+4}$" should be --$Co^{+4}$--.

Column 19, Line 21, "$CO_{1/3}$" should be --$Co_{1/3}$--.

Signed and Sealed this  
Thirty-first Day of July, 2018

Andrei Iancu  
*Director of the United States Patent and Trademark Office*